United States Patent
Tappeiner

(10) Patent No.: US 10,305,699 B2
(45) Date of Patent: *May 28, 2019

(54) DEVICE MANAGEMENT SYSTEM

(71) Applicant: Tekpea, Inc., Sunnyvale, CA (US)

(72) Inventor: Davide Tappeiner, Genoa (IT)

(73) Assignee: TEKPEA, INC., Sunnyvale, CA (US)

(*) Notice: Subject to any disclaimer, the term of this patent is extended or adjusted under 35 U.S.C. 154(b) by 292 days.

This patent is subject to a terminal disclaimer.

(21) Appl. No.: 15/354,413

(22) Filed: Nov. 17, 2016

(65) Prior Publication Data
US 2017/0070362 A1    Mar. 9, 2017

Related U.S. Application Data

(63) Continuation-in-part of application No. 15/202,178, filed on Jul. 5, 2016, which is a continuation of
(Continued)

(51) Int. Cl.
*G05B 11/01* (2006.01)
*G05B 15/02* (2006.01)
(Continued)

(52) U.S. Cl.
CPC .......... *H04L 12/2816* (2013.01); *G05B 11/01* (2013.01); *G05B 15/02* (2013.01); *G05B 19/0426* (2013.01); *G06Q 30/0283* (2013.01); *H04L 12/2823* (2013.01); *H04L 12/2836* (2013.01); *H04L 12/2856* (2013.01);
(Continued)

(58) Field of Classification Search
CPC ... H02J 3/00; G05B 2219/2642; G05B 15/02; H05B 37/0245
See application file for complete search history.

(56) References Cited

U.S. PATENT DOCUMENTS 5,862,391 A    1/1999  Salas et al.
5,949,779 A    9/1999  Mostafa et al.
(Continued)

FOREIGN PATENT DOCUMENTS

WO    2013158886 A1    10/2013

OTHER PUBLICATIONS

Choi, Tae-Seop et al., "Analysis of Energy Savings using Smart Metering System and IHD (In-Home Display)", Transmission & Distribution Conference & Exposition: Asia and Pacific, 2009, IEEE, Oct. 26, 2009, pp. 1-4, Piscataway, NJ, US.
(Continued)

*Primary Examiner* — Changhyun Yi
(74) *Attorney, Agent, or Firm* — Maschoff Brennan

(57) ABSTRACT

A management system includes an interface board configured to provide bi-directional communication between a networking device and one or more devices, wherein the interface board is coupled to the networking device and connects to one or more devices via one or more communication protocols supported by one or more devices. The management system further includes a management module connected to the interface board with the management module configured to receive, from the interface board, data packets generated by the one or more devices, and transmit the data packets to a remote server.

20 Claims, 12 Drawing Sheets

Related U.S. Application Data application No. 13/864,638, filed on Apr. 17, 2013, now Pat. No. 9,411,323.

(60) Provisional application No. 61/635,204, filed on Apr. 18, 2012.

(51) Int. Cl.
*G06Q 30/02* (2012.01)
*H04L 12/28* (2006.01)
*H04L 29/06* (2006.01)
*H04L 29/08* (2006.01)
*G05B 19/042* (2006.01)

(52) U.S. Cl.
CPC .............. *H04L 67/12* (2013.01); *H04L 69/08* (2013.01); *G05B 2219/25168* (2013.01)

(56) References Cited

U.S. PATENT DOCUMENTS

| | | |
|---|---|---|
| 6,778,099 B1 | 8/2004 | Meyer et al. |
| 6,961,641 B1 | 11/2005 | Forth et al. |
| 7,246,014 B2 | 7/2007 | Forth et al. |
| 8,332,055 B2 | 12/2012 | Veillette |
| 9,009,002 B2 * | 4/2015 | Jain .................... H04L 41/0645 702/185 |
| 9,411,323 B2 * | 8/2016 | Tappeiner .............. G05B 13/02 |
| 2005/0138432 A1 | 6/2005 | Ransom et al. |
| 2007/0013547 A1 | 1/2007 | Boaz |
| 2007/0222579 A1 | 9/2007 | Berkman |
| 2009/0210178 A1 | 8/2009 | Bieganski |
| 2010/0089909 A1 | 4/2010 | Besore et al. |
| 2011/0010016 A1 * | 1/2011 | Giroti .................... G05B 15/02 700/291 |
| 2011/0047370 A1 * | 2/2011 | Nagel ................. H04L 12/2836 713/150 |
| 2011/0202189 A1 | 8/2011 | Venkatakrishnan et al. |
| 2012/0323393 A1 | 12/2012 | Imhof et al. |
| 2013/0079941 A1 * | 3/2013 | Lin .................... H05B 37/0245 700/291 |
| 2013/0204452 A1 * | 8/2013 | Yamaguchi .............. H04B 3/54 700/292 |
| 2013/0214598 A1 * | 8/2013 | Burke .................... G05B 15/02 307/31 |
| 2013/0289790 A1 * | 10/2013 | Park .......................... G06F 1/26 700/295 |

OTHER PUBLICATIONS

Extended European Search Report dated Nov. 30, 2015 for European Patent Application No. 13777474.1.

* cited by examiner

DEVICE MANAGEMENT SYSTEM

RELATED APPLICATIONS

This application is a continuation-in-part of U.S. patent application Ser. No. 15/202,178, filed Jul. 5, 2016, which is a continuation of U.S. patent application Ser. No. 13/864,638, filed Apr. 17, 2013, which claims the benefit under 35 U.S.C. § 119(e) of U.S. Provisional Application No. 61/635,204, filed Apr. 18, 2012.

TECHNICAL FIELD

Embodiments of the disclosure relate generally to management systems.

BRIEF DESCRIPTION OF THE DRAWINGS

The present disclosure will be understood more fully from the detailed description given below and from the accompanying drawings of various embodiments. The drawings, however, should not be taken to limit the present disclosure to the specific embodiments, but are for explanation and understanding only.

DETAILED DESCRIPTION

Figure 1:
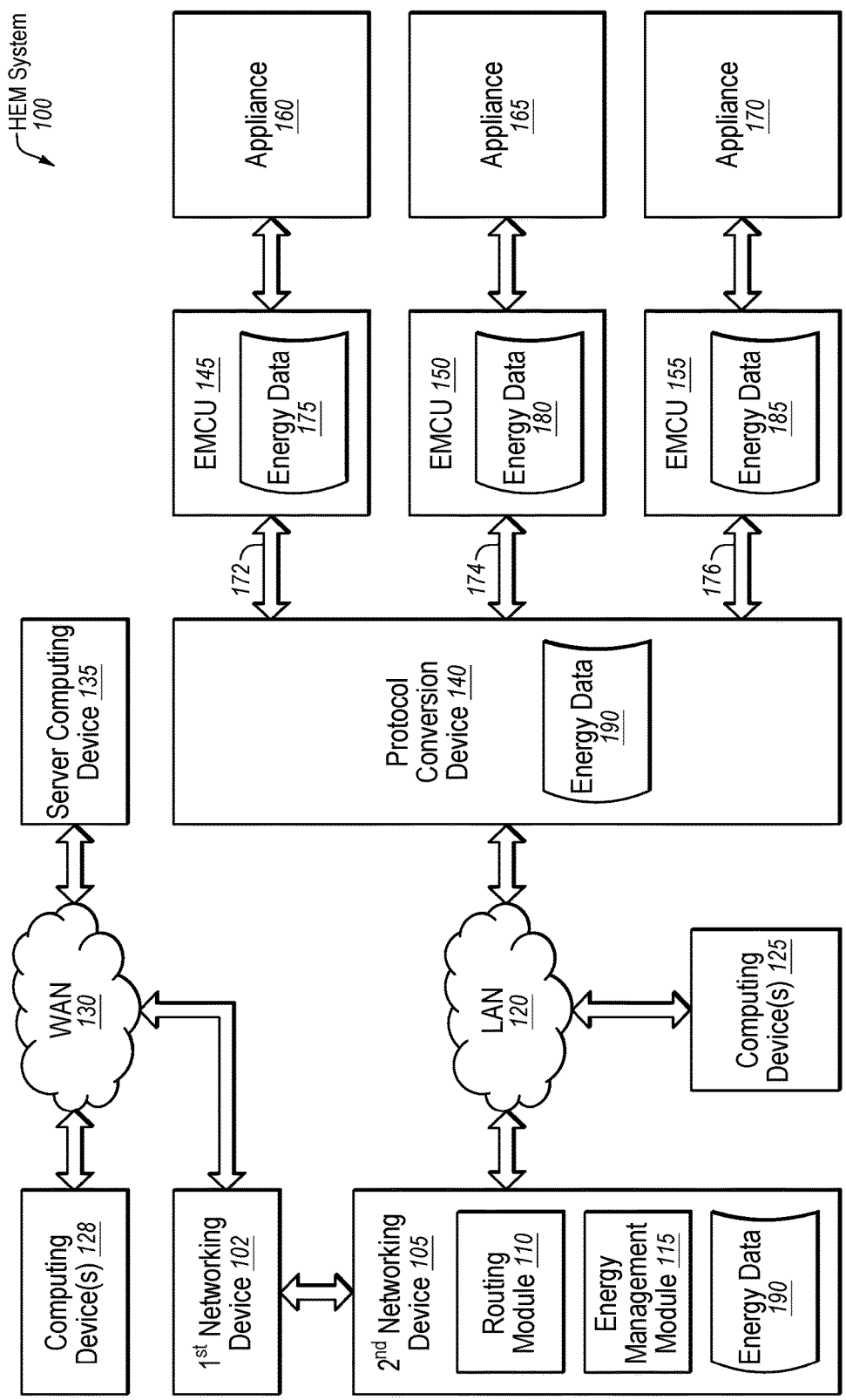
FIG. 1 is a block diagram showing one implementation of an energy management system.

Embodiments of the present disclosure describe a management system. The management system includes a networking device, one or more sensors and a protocol conversion device that connects the networking device to the one or more sensors. The networking device may be a commercial "off-the-shelf (OTS)" device (e.g., a cable modem provided by a cable service provider, a consumer WiFi router, a digital subscriber line (DSL) modem provided by a telephone network, etc.) with the addition of a management module. The protocol conversion device (also referred to as a management bridge, or bridge) connects to the networking device via a transmission control protocol/Internet protocol (TCP/IP) connection (e.g., over an Ethernet line) or over a wired serial interface and to the one or more sensors via additional connections supported by the sensors. The additional connections may include Zigbee™ connections, IPv6 over low power wireless personal area networks (6LoWPAN) connections, power line communication (PLC) connections, and so forth.

For simplicity of explanation, some aspects of the present disclosure are depicted and described in terms of an energy management system. However, systems and methods in accordance with this disclosure can occur in myriad applications and environments and may occur in various orders and/or concurrently and with other operations not presented and described herein. Further, systems and methods described herein are not limited to a home or to energy-related embodiments. Further, meters are examples of various devices that may be used, controlled and monitored by the disclosed systems and methods.

The sensors may include energy meters that may be energy monitoring and control units (EMCU) that sample energy usage of appliances connected to the energy meters, generate data packets from the sampling, and send the data packets to the protocol conversion device via one of the additional connections. The protocol conversion device may then forward the data packets to the networking device over the TCP/IP connection. The networking device may process the data packets and upload payloads of the data packets to a server. The networking device may additionally provide a user interface for controlling the energy meters and monitoring a current state and historical energy usage the appliances.

The home energy management system described in embodiments herein enables users to identify and monitor the energy usage of all of the appliances in their homes. The users may use this data and the home energy management system to control when appliances are powered and unpowered, thereby reducing overall energy consumption and associated costs. The home energy management system may also essentially extend a smart grid into homes and businesses, enabling energy utilities to identify the energy consumption of different types of appliances using anonymized energy consumption data. The home energy management system may provide utilities with access to actionable energy consumption information bundled with the ability to take real time action.

A management system described in embodiments herein includes an interface board configured to provide bi-directional communication between a networking device and one or more meters, wherein the interface board is coupled to the networking device and connects to one or more devices (e.g., meters, sensors, actuators) via one or more communication protocols supported by the one or more devices. The management system further includes a management module connected to the interface board with the management module configured to receive, from the interface board, data packets generated by the one or more devices, and transmit the data packets to a remote server.

The networking device may gain additional functionality with the addition of one or more expansion modules. Such expansion modules may include sensors, I/O interfaces, communication modules, etc. and may increase the management module's ability to receive and process various data (e.g., water, electricity, gas, pressure, light intensity). In spite of the expansion modules being any type of device and from any company, manufacturer or seller, the networking device may be quickly configured to use any expansion module. This may aid in solving a problem of conventional device that may not easily measure data received from different vendors and use it interchangeably between vendors. For example, the management module may send a first command to read a voltage from a first sensor from a first manufacturer and a second command to read a voltage from a second sensor from a second manufacturer. The response from each of these sensors may be different, encoded differently (e.g., the voltage may be reported in fractions, in decimals, with offsets, etc.). To complicate this problem, many manufacturers may not standardize or certify their communication formats/content delivery.

Aspects of the present disclosure address these and other limitations of conventional systems by handling data from different vendors and in different formats. Using techniques described herein, the networking device may unify data from different manufactures and in different formats (which may be proprietary).

Additionally, embodiments of a home energy management system described herein have a minimal energy footprint and reduced components as compared to traditional energy management solutions. In one embodiment, the home energy management system has a low overall power consumption, which enables the system to be an effective energy management system that has the potential to conserve more energy than it consumes. Additionally the home energy management system may provide a positive return on investment by lowering household energy expenditure.

Referring now to the figures, FIG. 1 is a block diagram showing one implementation of a home energy management (HEM) System 100. The HEM System 100 includes one or more networking devices (e.g., first networking device 102 and/or second networking device 105) connected to a protocol conversion device 140 over a local area network (LAN) 120 or over a wired serial interface 121 and to a server computing device 135 over a wide area network (WAN) 130 such as the Internet. The connection between, for example, the second networking device 105 and the protocol conversion device 140 may be a TCP/IP connection such as an Ethernet connection in a wired example or a WiFi connection in a wireless example.

The protocol conversion device 140 is in turn connected to multiple devices (e.g., one or more energy meters), which may be energy management and control units (EMCUs) 145, 150, 155, via additional connections 172, 174, 176. The additional connections 172, 174, 176 may use protocols supported by the devices 145-155 but potentially not supported by the second networking device 105. Examples of such connections include a Zigbee connection, a 6LowPAN connection, a generic radio frequency (RF) connection, a proprietary RF connection, a power line communication (PLC) connection, or other connection types. Different EMCUs 145-155 may support different connection types (different protocols), and some EMCUs 145-155 may support multiple different connection types.

EMCUs 145-155 may be energy meters that additionally include control functionality as well as communication functionality. The EMCUs 145-155 may include one or more memories, a processing device, and a communication interface. The memory may be a non-volatile memory that stores firmware for the EMCU and/or a volatile memory. The processing device may include a programmable logic controller (PLC), a microcontroller, microprocessor or programmable logic device such as a field programmable gate array (FPGA) or a complex programmable logic device (CPLD). Each of the EMCUs 145-155 may consume approximately 1 Watt, 0.5 Watt or less power when in standby. Moreover, the power consumed by the EMCUs may be approximately 1 Watt even when under power.

Each of the EMCUs 145-155 may be connected to or integrated into one or multiple appliances 160-170. The appliances 160-170 may be any powered device that can plug into an electrical outlet. Examples of appliances 160-170 include electric ovens, electric ranges, microwave ovens, coffee makers, washing machines, dryers, dishwashers, televisions, lights, fans, set top boxes, vacuum cleaners, air conditioners, and so on.

In one embodiment, the EMCUs 145-155 plug into electrical outlets, and the appliances 160-170 plug into the EMCUs 145-155. For example, the EMCUs 145-155 may be wall outlet EMCUs having a single switchable outlet and a single measuring point. The EMCUs 145-155 may also be power strip EMCUs having multiple configurations with switchable outlets (e.g., 6 outlets in one embodiment) and multiple measuring points.

In one embodiment, the EMCUs 145-155 are integrated into the appliances 160-170. For example, the EMCUs 145-155 may be components that are provided to manufacturers of the appliances 160-170. The EMCUs 145-155 provided to the manufacturer may be preconfigured for communicating with a specific type (e.g., model) of protocol conversion device 140 using a particular communication protocol. In another embodiment, the EMCUs 145-155 are integrated into wall outlets.

The EMCUs 145-155 can both monitor and control the flow of power to attached appliances 160-170. Additionally, in some embodiments the EMCUs 145-155 can issue commands to the attached appliances 160-170. In one embodiment, an EMCU 145-155 can communicate with the appliance 160-170 that it is attached to in order to identify a make, model and device type of the appliance 160-170. The appliance 160-170 may send this information to the EMCU 145-155. The appliance 160-170 may also send data identifying the appliance's condition and/or state of repair to the EMCU 145-155. The EMCU 145-155 may then report this information to protocol conversion device 140, which may forward the information to networking device 105. Alternatively, a user may manually input a make, model and/or device type for appliances via a GUI provided by the networking device 105 or via a simple user interface on the appliance.

The EMCUs 145-155 may have communication interfaces configured to support one or more communication interfaces and protocols for two way communication with the protocol conversion device 140. In one embodiment, one or more of the EMCUs 145-155 supports a PLC protocol. In one embodiment, one or more of the EMCUs 145-155 supports the Zigbee protocol. EMCUs 145-155 may also support 6LowPAN, generic RF, Bluetooth, WiFi, or other communication standards. In one embodiment, one or more EMCUs 145-155 support a combination of protocols, such as both Zigbee and RF.

The EMCUs 145-155 collect and store energy consumption data 175, 180-185. The EMCUs 145-155 additionally periodically send data packets containing the energy consumption data 175-185 to the protocol conversion device 140.

In one embodiment, the EMCUs 145-155 can receive ON, OFF and STANDBY commands from the protocol conversion device 140. EMCUs 145-155 may also receive a power level state command that specifies a particular power level to use. The command may specify a particular voltage to provide to an appliance, or may indicate a percentage of a full operating voltage or percentage of a standby voltage to apply. For example, the power level state command may identify that 2 Watts be provided to an appliance, or that 40% of a measured maximum power be supplied. The power level state may be used, for example, for dimming of a light or to provide half power to a motor. The EMCUs 145-155 may also receive increment power or decrement power commands, which may be used to increment or decrement an amount of power provided to an appliance by a particular amount (e.g., by 0.2 Watts).

An EMCU 145-155 can then relay received commands to an appliance 160-170 connected to the EMCU 145-155 and/or control the power delivered to the appliance 160-170 responsive to the commands. Responsive to an ON command, the EMCU 145-155 may power on an appliance. Responsive to an OFF command, the EMCU 145-155 may power off an appliance. Responsive to a STANDBY command, the EMCU 145-155 may place an appliance into a standby mode. While in the standby mode, the appliance 160-170 may consume a minimal amount of power, but may be turned on relatively quickly (as opposed to an amount of time that it may take to turn the appliance on from an off condition). Responsive to a power level state command, the EMCU 145-155 may provide a specified level of power to an appliance.

Responsive to an increment power command, the EMCU may increase the power supplied to an appliance by a specified amount. For example, an increment power command may specify that a provided power is to be increased by 1 Watt. An EMCU 145-155 receiving such a command may increase a current provided power from, for example, 1 Watt to 2 Watts. If no increment value is specified, then an EMCU 145-155 may increment the power by a default incremental amount. A decrement power command may operate in the same manner as described above with regards to the increment power command, but may instead cause an EMCU 145-155 to reduce a supplied power rather than increase the supplied power.

The protocol conversion device (also referred to as an energy management bridge) 140 is a multi-protocol, multi-standard hardware adapter that provides the means to fill technology gaps involving different communication media and protocols that may not be supported by the networking devices 102, 105. The protocol conversion device 140 creates a uniform 2-way communication mechanism between the TCP/IP protocol and the protocols supported by the EMCUs 145-155. The protocol conversion device 140 may include a volatile and/or non-volatile memory, a processing device (e.g., a microcontroller, microprocessor, FPGA, CPLD, etc.), and multiple communication interfaces to support different communication protocols such as power line communication (PLC), Zigbee, RF (generic and non-generic), 6LowPAN, WiFi, or any other protocol.

The protocol conversion device 140 receives data packets containing the energy consumption data 175-185 from the EMCUs 145-155. The protocol conversion device 140 then forwards the data packets on to the second networking device 105 (or to the first networking device 102 in some implementations). The protocol conversion device 140 may also store energy consumption data 190, which may include energy consumption data 175-185 received from multiple EMCUs 145-155.

In one embodiment, the first networking device 102 is a cable modem, a DSL modem, a DSL router, a wireless telecommunication modem (e.g., a long term evolution (LTE) modem, a worldwide interoperability for microwave access (WiMAX) modem, a universal mobile telecommunications (UMTS) modem, etc.), or other internet router capable of connecting the WAN 130 to the LAN 120 or a wired serial interface 121. The second networking device 105 may be a WiFi router, a network switch, a wireless access point, or other device capable of providing access to multiple computing devices on the LAN 120 or on a wired serial interface 121. In one embodiment, a single networking device provides the functionality of the first and second networking devices 102, 105. The networking devices 102, 105 may each consume 1 Watt, 0.5 Watt or less of power when in standby, and may consume approximately 5 Watts or less of power while in operation.

The first networking device 102 and second networking device 105 may each include a memory (e.g., Flash memory, read only memory (ROM), or other non-volatile memory) that stores firmware for the networking device. The networking devices 102, 105 may additionally include processing devices that execute instructions in the firmware. In one embodiment, the firmware of the second networking device 105 includes a routing module 110 and an energy management module 115. The routing module 110 may be standard firmware for a wireless router (e.g., a WiFi router) or other networking device that provides typical networking functionality for the second networking device 105. For example, if the second networking device 105 is a wireless router, then the routing module 110 may perform functions of a router, a network switch and a wireless access point.

The energy management module 115 may be hardware, firmware or software installed on a standard networking device 105, such as an Internet router. The energy management module 115, when installed on the networking device, converts the networking device 105 into an energy management gateway. Converting a networking device into an energy management gateway without compromising any of the networking device's existing functionality may be performed using a combination of the energy management module 115 and the attached protocol conversion device 140. The networking device 105, with the energy management module 115 running on it, may serve as the brains of the HEM System 100, by storing and saving all commands, configurations and data for different components of the HEM System 100. Note that though second networking device 105 is shown as containing the energy management module 115, the energy management module 115 may alternatively be included in the first networking device 102.

The energy management module 115 receives the data packets containing the energy consumption data (also referred to as energy data) 190 collected by the multiple EMCUs 145-155 from the protocol conversion device 140. The energy management module 115 may cache the energy consumption data 190. Additionally, the energy management module 115 may upload the energy consumption data 190 to the server computing device 135.

The energy management module 115 provides a local graphical user interface for EMCU monitoring and control. The local graphical user interface may be accessible from the LAN 120 or over a wired serial interface 121 regardless of a state of connectivity to WAN 130. Computing devices 125 such as personal computers, tablet computers, notebook computers, mobile phones, smart televisions, etc. connected to the LAN 120 or a wired serial interface 121 may log into the interface provided by the energy management module 115 on the second networking device 105. Once a computing device 125, 128 is logged into the energy management module 115, the local interface enables users to view real-time and historical consumption data, control appliances 160-170 and set schedules for these appliances 160-170. The local interface and web service of the server computing device 135 give energy consumers actionable energy consumption information bundled with the ability to take real-time action from anywhere at any time.

In one embodiment, the energy management module 115 provides a secure, always on connection between the EMCUs 145-155 and the server computing device 135 (so long as the second networking device 105 has a connection to WAN 130). Alternatively, the energy management module 115 may periodically connect to the server computing device 135 to upload energy consumption data.

The server computing device 135 provides an energy management service platform, which is a comprehensive suite of services and web-based applications with 24/7 availability. The service platform stores data and outputs it to a secure, web-based, graphic user interface that enables real-time and historical data review, remote control of EMCUs 145-155, and administration of accounts and services. Remote computing devices 128 connected to the WAN 130 may log into web based interface to gain access to and control the home energy management system 100. Accordingly, a user may log in to control all of his appliances from outside of his or her home.

The energy management service platform may include a communication platform, a repository system, an application programming interface (API), an end-user application and a customer application. The communication platform is middleware that securely manages the flow of data from deployed HEM Systems. The server computing device 135 may use SSL (e.g., Open SSL) to establish a secure connection to the energy management module 115 (and thus to the home energy management system 100). The communication platform's core functions are to maintain a secure, persistent connection with deployed energy management modules 115, acquire consumption and operational data from deployed energy management modules 115, perform maintenance tasks, such as updating firmware, notifying end-users of events they want to know about via chat, email or SMS, and relaying user-defined appliance control and scheduling instructions to deployed energy management modules 115.

The repository system stores energy consumption data retrieved from energy management modules 115 and makes this data available to applications through the API. The API is the programming environment in which parties can develop services for delivery to consumers over the energy management service platform. Applications will have the ability take advantage of anonymized energy consumption data obtained by EMCUs in the field. Developers may not retain this information, but they may be allowed to use it in applications they build.

The end-user application provides a front end interface that enables energy consumers to create and set up accounts, control appliances, set schedules for appliances, monitor real-time energy consumption (cumulative or by appliance), access historical consumption data (cumulative or by appliance), configure system settings, and modify account details and personal preferences. The customer application is a front end interface built primarily for use by utility companies, but it may be accessed by other customer types (i.e. telecommunications companies) that deploy the HEM System 100 to their customers. The customer application gives these organizations the means to access real-time and historical energy consumption data at a macro and micro level, export energy consumption data into tools of their choice so they may analyze data and better predict the future demand for energy, suggest behavioral changes that help their customers save energy, and perform other actions. For example, via the customer application, electric utilities may remotely run diagnostic tests and perform maintenance on deployed systems and push relevant data to deployed systems (i.e. changes in energy cost).

The home energy management system 100 described in embodiments above may offer 2 services—one for energy consumers and another for utility companies. The service for consumers provides real-time and historical energy consumption data by appliances or similar devices. It also gives consumers the ability to control appliances or similar devices and set schedules for them via a local interface or the Internet. When bundled with pricing information from their utility company, energy consumers can see how much energy they are using, in kilowatts and dollars, and instantly take the action that makes the most financial and environmental sense for them.

The service for utility companies provides detailed consumption data beyond the electric meter. Utilities may obtain information on how much energy each appliance within a home or office consumes and how frequently it is used. Information may be provided at a macro level, for an entire coverage area. Alternatively, the information can be broken down to the point where utilities can view consumption information from a single home or business. This enables the utility to quantify any similarities in energy usage patterns by city, neighborhood or street.

Traditional home energy management solutions contain a residential gateway device and consume more energy than they need to. Residential gateways and networking devices such as modems or routers consume roughly the same amount of energy—approximately 5 watts. Overall consumption by traditional home energy management solutions when these devices are used in parallel is approximately 10 watts. Use of the protocol conversion device 140 and energy management module 115 as described herein removes one energy consuming device (the residential gateway) from the equation and instantly cuts consumption costs in half. Additionally, by eliminating the residential gateway, the HEM System 100 described in embodiments herein eliminates the upfront purchase of a service enabling hardware device (the residential gateway). That, in turn, speeds up the time to positive return on investment for energy consumers by reducing an overall cost of the HEM System 100. Accordingly, embodiments both reduce an upfront cost and a total cost of ownership.

Figure 2:
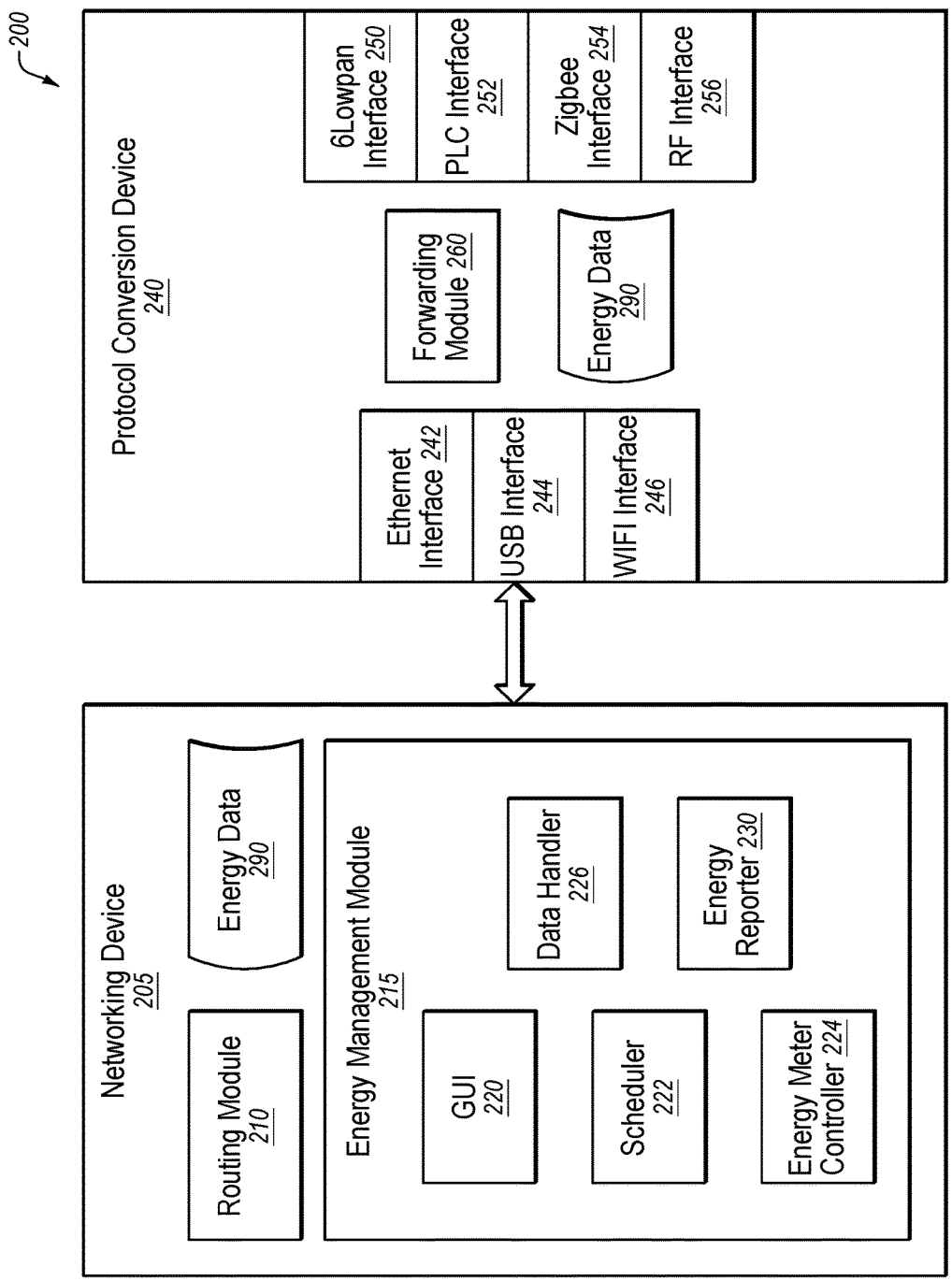
FIG. 2 is a block diagram illustrating two components of an energy management system, in accordance with one implementation of the present disclosure.

FIG. 2 is a block diagram illustrating two components of a home energy management system, in accordance with one implementation of the present invention. Specifically, FIG. 2 illustrates a standard networking device 205 that has been modified to act as a residential gateway for a home energy management system. FIG. 2 further illustrates a protocol conversion device 240 connected to the networking device 205. The protocol conversion device 240 may act as an energy management bridge for the home energy management system.

The networking device 205 may be a standard networking device that performs the functions of one or more of a cable modem, a DSL modem, a DSL router, a wireless router, a network switch, a wireless access point, and so on. In one embodiment, the networking device 205 includes a routing module 210 that performs standard operations of the networking device 205 as well as an energy management module 215 that adds functionality of a residential gateway for a HEM System to the networking device 205.

The energy management module 215 may be software or firmware that has been added to a non-volatile memory of the networking device. Alternatively, or additionally, the energy management module 215 may include a hardware logic (e.g., a circuit chip) that is installed on the networking device. The energy management module 215 may be installed onto the networking device by an end user, by a service provider (e.g., by an internet service provider) or by a manufacturer of the networking device. In one embodiment, the protocol conversion device 240 installs the energy management module 215 on the networking device 205. Responsive to the protocol conversion device 240 being connected to the networking device 205, the protocol conversion device 240 may detect that the networking device 205 has sufficient memory to store the energy management module 215. The protocol conversion device 240 may then query a remote server and request that the remote server install the energy management module 215 on the networking device 205.

Alternatively, the protocol conversion device 240 may include one or more energy management module installation routines. When the protocol conversion device 240 is connected to a networking device, the protocol conversion device 240 may identify a chipset included in the networking device 205, and may select an installation routine appropriate to the identified chipset. The protocol conversion device 240 may then install a version of the energy management module 215 compatible with the identified chipset using the appropriate installation routine.

The combination of the protocol conversion device 240 and the energy management module 215 in the standard networking device 205 bridges the communication gap between EMCUs, which communicate over one set of communication protocols, and the Internet, which has its own set of communication processes and protocols. The energy management module 215 and protocol conversion device 240 together eliminate any need for a dedicated residential gateway hardware device, thereby reducing upfront hardware costs and overall energy consumption rate.

In one embodiment, the energy management module 215 includes a graphical user interface (GUI) 220, a scheduler 222, an energy meter controller 224, a data handler 226 and an energy reporter 230. The GUI 220 may enable end-user access to all components of the HEM System, including the energy management module 215, the protocol conversion device 240 and EMCUs. The GUI 220 additionally provides system monitoring, control and configuration capabilities locally to a user (without the need for an Internet connection) and remotely (over the Internet).

Energy meter controller 224 issues commands to EMCUs. The commands may include on, off and standby commands. The commands may also include power level state commands, increment power commands and decrement power commands. The commands may be issued responsive to user interaction with the GUI. Alternatively, the commands may be issued responsive to instructions received from a remote server (e.g., from a remote server that provides a web interface for the energy management modules 215). The commands may also be generated automatically by the scheduler 222 according to a configured schedule.

Scheduler 222 automates power control of EMCUs and the appliances or similar devices connected to the EMCUs. Scheduler 222 may include a separate schedule for each EMCU and/or each appliance, or any combination thereof. The schedules may be set by a user via the GUI 220 and/or may be automatically set from instructions from a remote server or based on energy usage statistics. For example, appliances that consume large amounts of energy may automatically be scheduled to power off during peak energy usage hours (when the cost of energy may be at its highest). Each schedule may identify when to power on an appliance, when to power off an appliance, and so on.

Energy reporter 230 may generate statistics from received energy data 290. For example, energy reporter 230 may determine average daily, weekly, monthly, yearly, etc. energy usage for each appliance, generate energy usage graphs showing when appliances are used, and so on. Energy reporter 230 may also receive energy cost data from a remote server, and may use the cost data and energy data 290 to compute the average daily, weekly, monthly, yearly, etc. energy cost of each appliance. Energy reporter 230 may also receive energy usage statistics from a remote server. The remote server may receive the energy data 290 from data handler 225, compute the energy usage statistics, and provide the energy usage statistics to energy reporter 230.

Energy management module 215 receives data packets containing energy consumption data 290 from protocol conversion device 240. Data handler 226 may then cache the energy data 290 locally until the data is successfully uploaded to a remote data center via the internet, deleted by an end-user manually, or deleted by the system to make room for new data. The amount of data which can be stored locally may be dependent on storage capacity of the networking device. For example, cable modems and DSL routers may have minimal storage capacity. Accordingly, if the networking device 205 is a cable modem or a DSL router, then data handler 226 may store minimal or no energy data 290 on the networking device 205. In contrast, wireless routers typically have enough storage capacity to store up to a month of energy data 290.

In one embodiment, data handler 226 caches data on multiple different devices. For example, data handler 226 may cause protocol conversion device 240 to store energy data 290, and may cause EMCUs to store energy data. In one embodiment, the EMCUs, protocol conversion device 240 and networking device 205 maintain redundant copies of energy data. For example, The EMCUs may store the last 30 minutes of energy data, the protocol conversion device may store the last hour of energy data, and the networking device may store the last four hours of energy data. Alternatively, the EMCUs, protocol conversion device 240 and networking device 205 cache different energy data. For example, the EMCUs may store the last 30 minutes of energy data, the protocol conversion device may store the previous 4 hours of energy data (e.g., from 30 minutes in the past to 4.5 hours in the past), and the networking device 205 may store the previous 8 hours of energy data (e.g., from 4.5 hours in the past to 12.5 hours in the past).

Data handler 226 may receive data packets that contain the energy data 290, and may modify or otherwise process the data packets. Data handler 226 may decrypt the data packets, extract payloads from the data packets, aggregate the payloads to generate new household power consumption messages, and so on. Data handler 226 may then transmit the household power consumption messages to a remote server.

In one embodiment, the energy management module 115 provides an application programming interface (API) that enables third parties to develop new services for delivery over the HEM System. This gives third parties the ability to offer new products and services to a targeted audience (electric companies and energy conscious consumers).

Protocol conversion device 240 connects to networking device 205 via a TCP/IP protocol connection, such as an Ethernet connection or a WiFi connection. Protocol conversion device 240 includes multiple communication interfaces, such as an Ethernet interface 242, a universal serial bus (USB) interface 244, a WiFi interface 246, a 6LowPAN interface 250, a PLC interface 252, a Zigbee interface 254 and a generic RF interface 256.

Protocol conversion device 240 additionally includes a forwarding module 260 that receives data packets on an incoming communication interface and transmits the data packets on an outgoing communication interface. In one embodiment, the protocol conversion device 240 does not attempt to interpret the payload of data packets being routed through it. This allows the protocol conversion device 240 to handle different schemas of data encryption and different protocols during the data exchange process.

All data exchanged through the protocol conversion device may have a common, unencrypted header that contains routing information, and may additionally include a payload. The payload may be encrypted on unencrypted. The header of a received data packet may have a fixed size and contain information such as a source protocol identifier (ID), a source global unique identifier (GUID), a destination protocol ID, and a destination GUID. The protocol ID is a unique number that identifies the communication protocols involved in each specific data packet. In one example, 01='Ethernet', 02='powerline', 03='Zigbee, and so on. The source protocol ID identifies the protocol used by the source device and the destination protocol ID identifies the protocol used by the destination device. The GUID is a unique number used to identify every device in the network. The source GUID identifies the source device for a data packet and the destination GUID identifies the destination device for the data packet.

Forwarding module 260 may analyze a received data packet to identify a destination GUID and a destination protocol ID. The forwarding module 260 may then forward the data packet to the destination device having the destination GUID using a protocol having the destination protocol ID. For example, protocol conversion device 240 may receive a data packet from networking device 205 via Ethernet interface 242 that is addressed to a particular EMCU.

Forwarding module 260 may identify the particular EMCU in the header and determine that the EMCU supports a PLC protocol. Accordingly, forwarding module 260 may transmit the data packet to the particular EMCU using the PLC interface 252. The protocol conversion module 240 may also support additional routing methods such as wide broadcast routing and narrow broadcast routing. "Broadcasting" in this instance, refers to transmitting data packets that are received by every device in a network. The protocol conversion device 240 can, when connected to networking device 205 through an Ethernet port, carry out additional tasks such as relaying data for communication with a server computing device, forwarding of security certificates, implementation of system configuration data, verification of system identification and more.

In one embodiment, the payload of data packets are encrypted at the two endpoints (source and destination), which recognize the encryption method and how to decode the message. The endpoints may be, for example, the networking device 205 and EMCUs. In one embodiment, data handler 226 encrypts data packets that are to be sent to other devices such as EMCUs, protocol conversion device 240 or a remote server. Data handler 226 may additionally decrypt data packets received from such other devices. Standard symmetric and/or asymmetric encryption techniques using shared keys or public key pairs may be used to encrypt and decrypt messages. For example, the networking device, server and EMCUs may each have digital certificates associated with a unique public key pair. The EMCUs may include a public key of the networking device, and the networking device 205 may include public keys of the EMCUs. Therefore, the EMCUs may encrypt data using their private keys, and the networking device may decrypt the data using a stored copy of the EMCU's public keys. In one embodiment, the protocol conversion device 240 forwards encrypted data packets without reading or decrypting a payload of the data packets.

Figure 3:
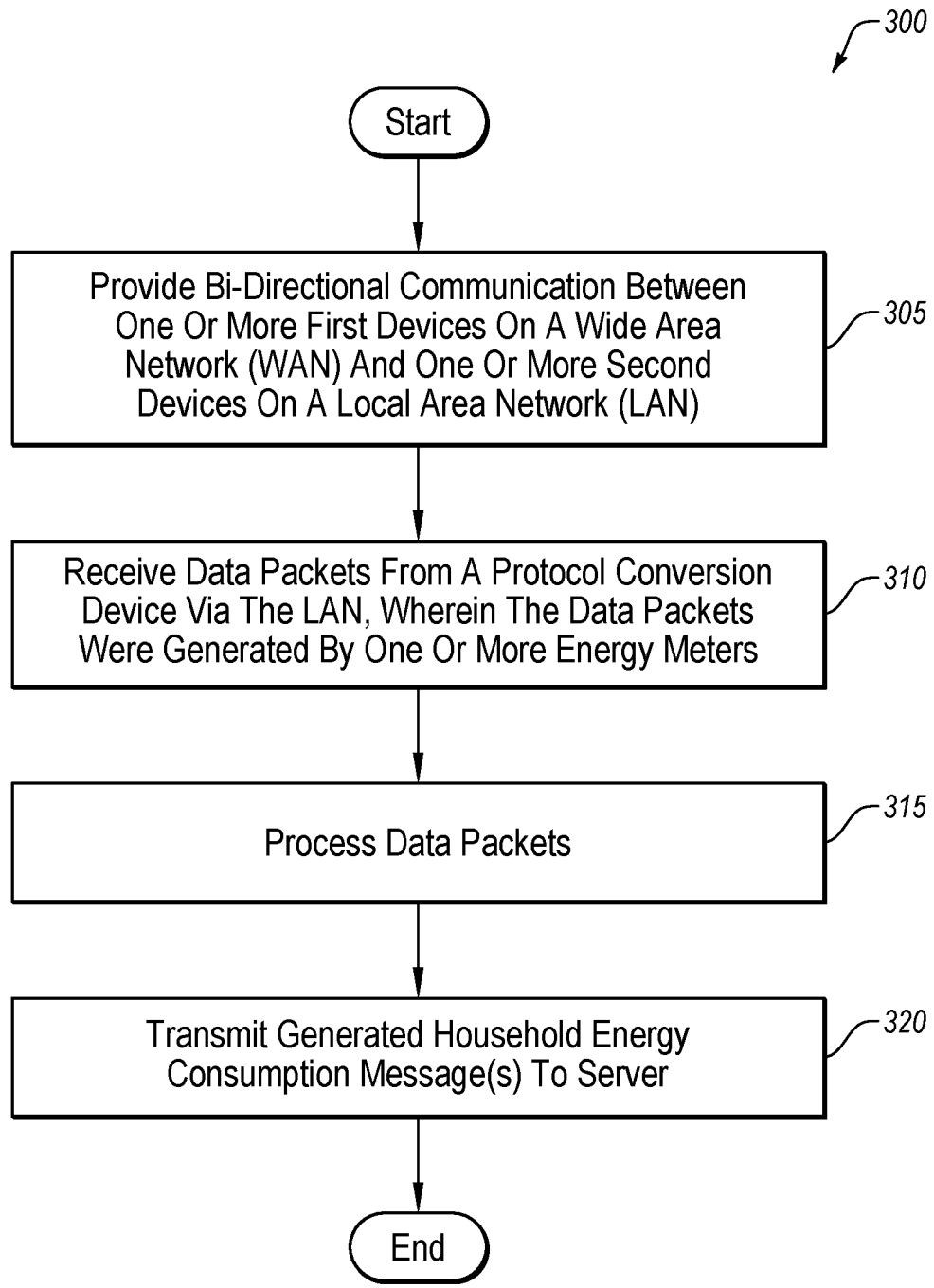
FIG. 3 is a flow diagram illustrating one embodiment of a method for processing sensor data by a networking device configured to be a component of a management system.
Figure 4:
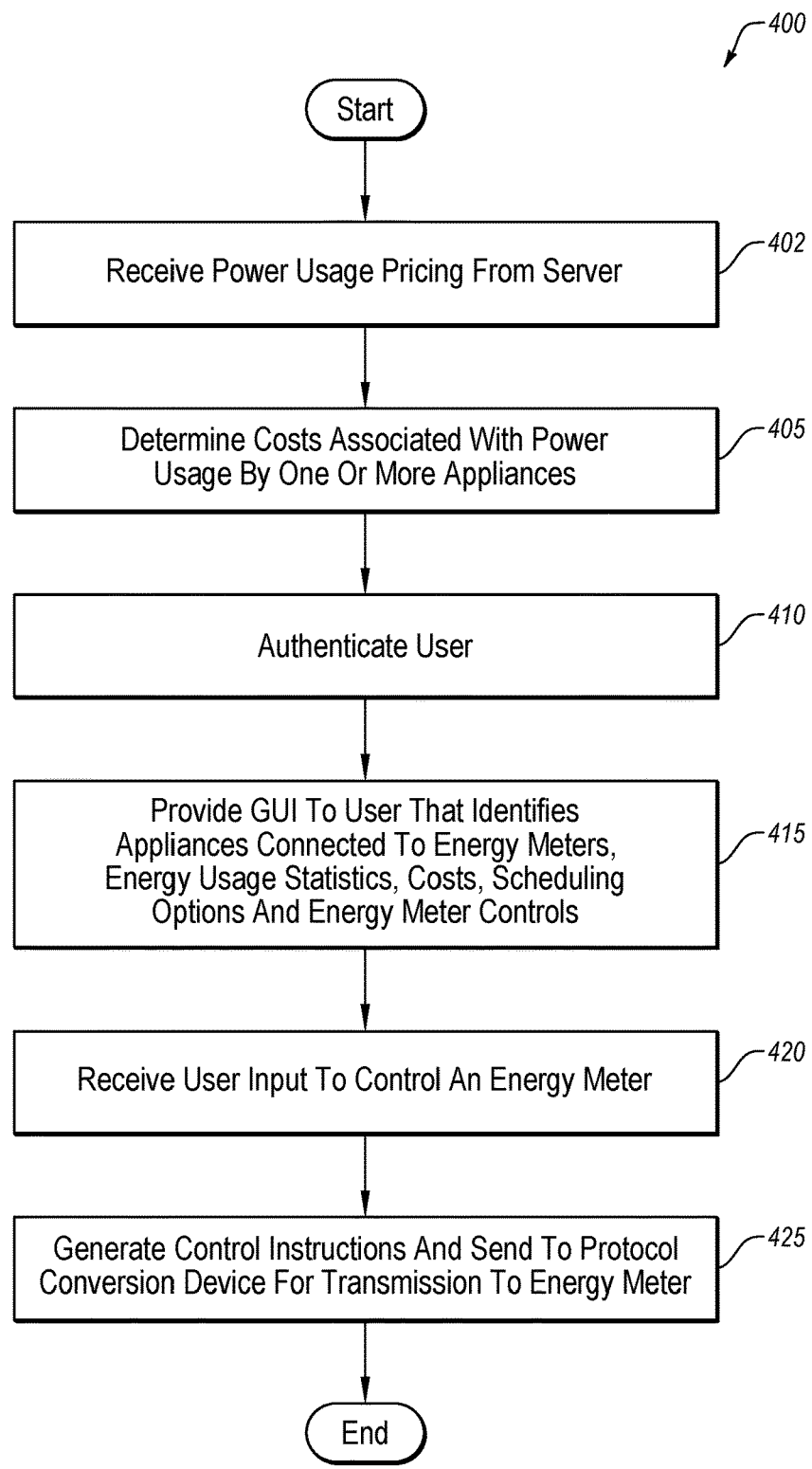
FIG. 4 is a flow diagram illustrating one embodiment of a method for controlling a management system.
Figure 5:
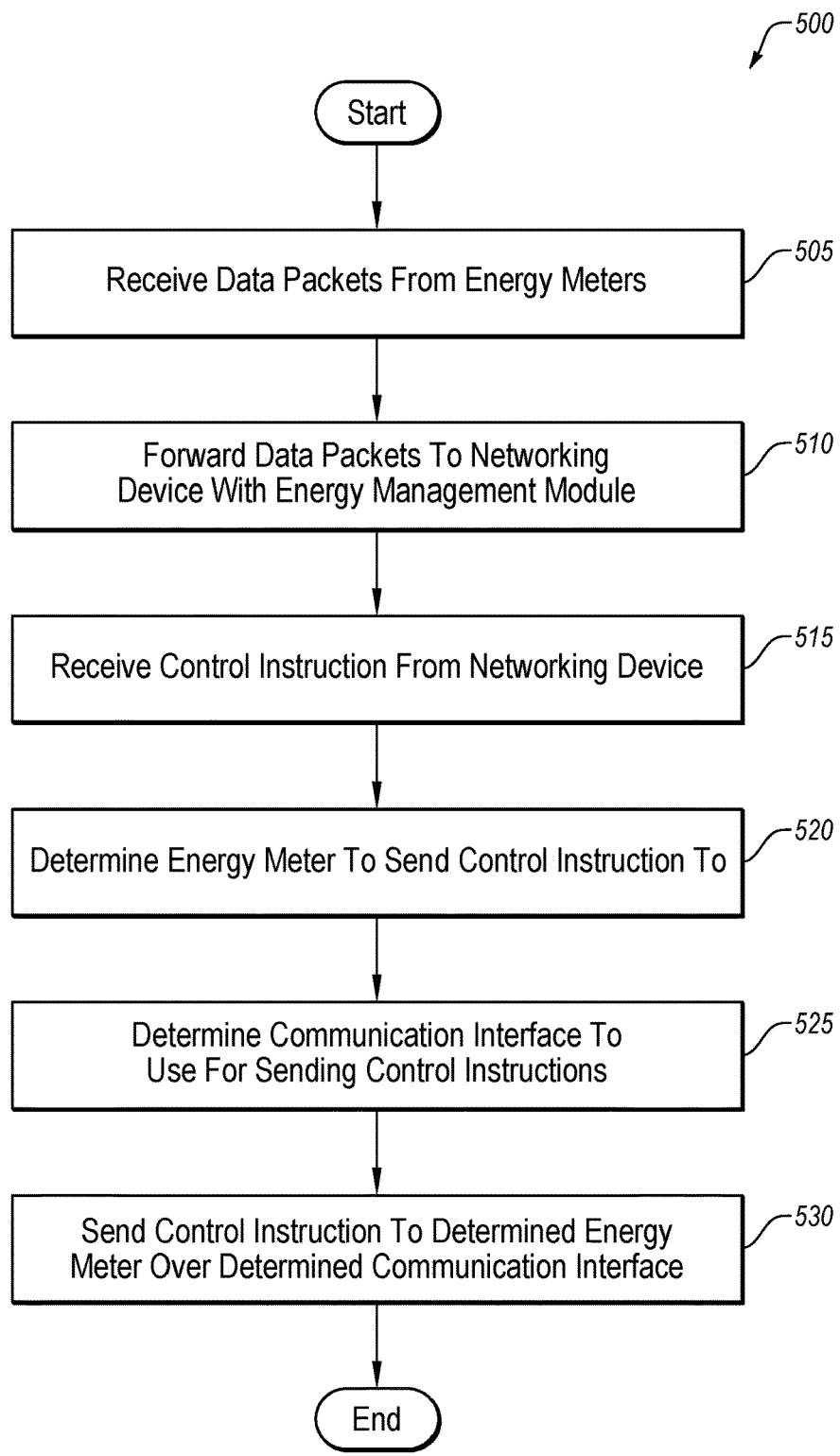
FIG. 5 is a flow diagram illustrating one embodiment of a method for connecting sensors to a networking device.

FIGS. 3-5 are flow diagrams showing various methods for providing and controlling a home energy management system. The methods may be performed by one or more components of an energy management system, such as a networking device configured to function as an energy management gateway and a protocol conversion device that acts as an energy management bridge. The devices that perform the methods may comprise hardware (e.g., circuitry, dedicated logic, programmable logic, microcode, etc.), software (e.g., instructions run on a processing device to perform hardware simulation), firmware, or a combination thereof. In one embodiment, at least some operations of the methods are performed by energy management module 115 and at least some operations of the methods are performed by protocol conversion device 140 of FIG. 1.

FIG. 3 is a flow diagram illustrating one embodiment of a method 300 for processing energy usage data by a networking device configured to be a component of a home energy management system. At block 305 of method 300, processing logic provides bi-directional communication between one or more first devices on a wide area network (WAN) and one or more second device on a local area network (LAN). At block 310, processing logic receives data packets from a protocol conversion device via the LAN. The data packets may have been generated by one or more energy meters (e.g., by EMCUs). The received data packets contain energy consumption data associated with one or more appliances or similar devices connected to the energy meters.

At block 315, processing logic processes the data packets. This may include decrypting the data packets, extracting payloads from the data packets, and so on. Processing logic may additionally generate household energy consumption messages. At block 320, processing logic transmits the generated household energy consumption messages to a server. The server may then compute energy consumption statistics from the energy consumption data and provide the energy consumption statistics to, for example, a networking device that includes an energy management module.

FIG. 4 is a flow diagram illustrating one embodiment of a method 400 for controlling a home energy management system. At block 402 of method 400, processing logic receives power usage pricing from a server. At block 405, processing logic determines costs associated with power usage by one or more appliances connected to energy meters in a HEM System.

At block 410, processing logic receives a login request and authenticates a user based on user provided credentials. At block 415, processing logic provides a graphical user interface to the user that identifies appliances connected to the energy meters, energy usage statistics, costs associated with power consumption of the appliances, scheduling options and energy meter controls. At block 420, processing logic receives a user input to control an energy meter. At block 425, processing logic generates control instructions and sends the control instructions to a protocol conversion device as a payload in a data packet. The data packet may be sent to the protocol conversion device via a TCP/IP connection. The protocol conversion device then forwards the data packet to the energy meter via a second connection that uses a different protocol, such as a Zigbee or PLC protocol. The energy meter may then execute the instructions, which may cause the energy meter to turn an appliance on, turn an appliance off, and so on.

FIG. 5 is a flow diagram illustrating one embodiment of a method 500 for connecting energy meters to a networking device. At block 505 of method 500, processing logic of a protocol conversion device receives data packets from one or more energy meters (e.g., from EMCUs). At block 510, processing logic forwards the data packets to a networking device that includes an energy management module. At block 515, processing logic receives control instructions from the networking device. The control instructions may be received as a data packet. The data packet may include a header identifying a source device, a destination device, a source protocol and a destination protocol. At block 520, processing logic examines the header to determine a particular energy meter to transmit the control instruction to. At block 525, processing logic determines from the header a protocol (and thus communication interface) to use for sending the control instruction to the particular energy meter. At block 530, processing logic sends the control instruction to the determined energy meter using the determined communication interface and protocol.

Figure 6A:
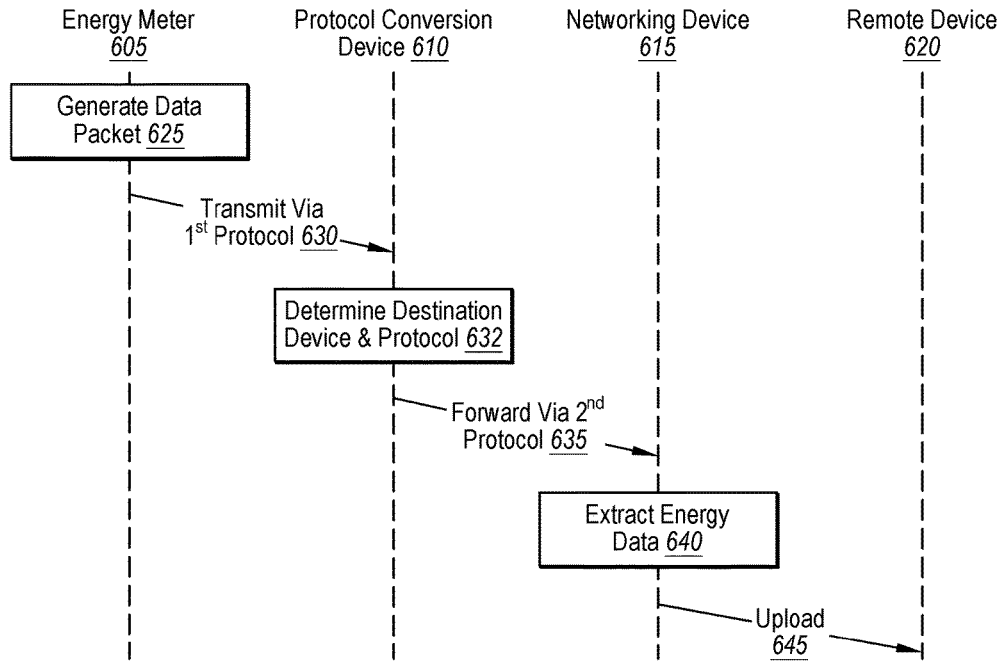
FIG. 6A illustrates a sequence diagram showing one embodiment of collecting and reporting sensor data by a management system.
Figure 6B:
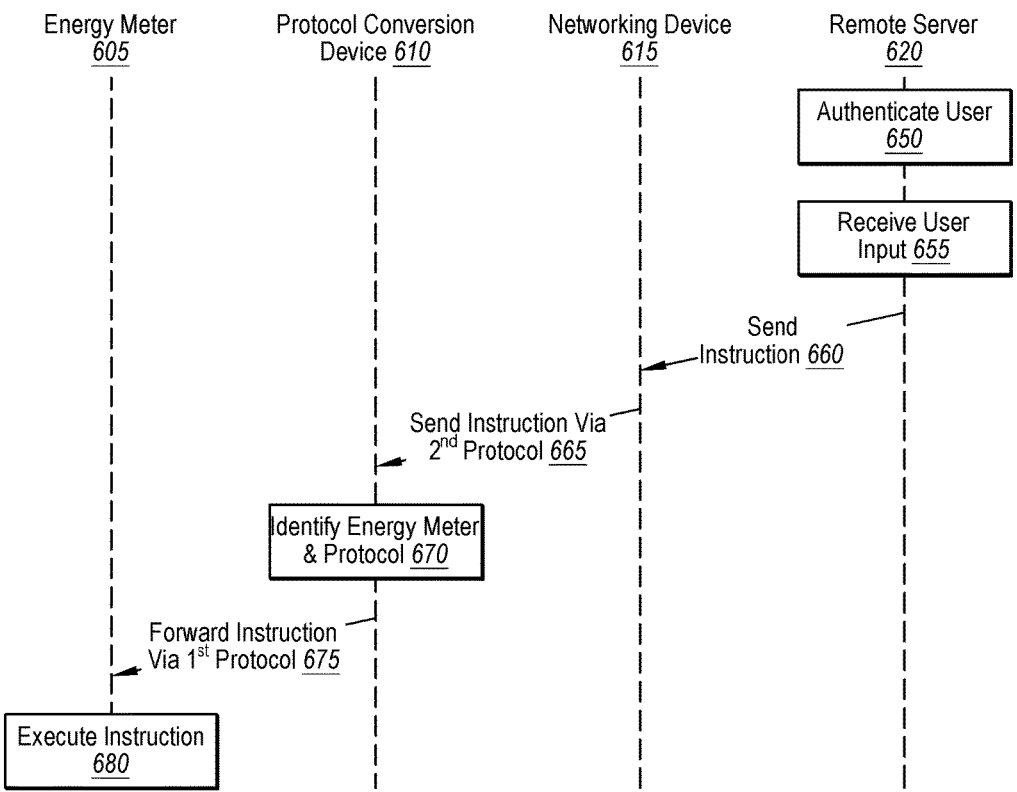
FIG. 6B illustrates a sequence diagram showing one embodiment of controlling a management system.

FIG. 6A illustrates a sequence diagram showing one embodiment of collecting and reporting energy usage data by an energy management system. FIG. 6B illustrates a sequence diagram showing one embodiment of controlling an energy management system. The energy management system includes an energy meter 605 (e.g., an EMCU), a protocol conversion device 610 (e.g., an energy management bridge), a networking device 615 (configured to operate as a residential gateway) and a remote server 620.

In FIG. 6A, the energy meter 605 generates a data packet at block 625. The generated data packet may include an unencrypted header identifying the energy meter 605 as a source device and the networking device 615 as a destination device. The header may also identify a first protocol associated with the energy meter 605 and a second protocol associated with the networking device. The generated data packet may also include an encrypted payload that includes energy consumption data of an appliance monitored by the energy meter 605. The energy meter 605 transmits the data packet via the first protocol 630 to the protocol conversion device 610.

At block 632, the protocol conversion device 610 determines that the data packet is addressed to the networking device 615 and a second protocol associated with the destination device. The protocol conversion device 610 then forwards 635 the data packet to the networking device 615 using the identified second protocol.

At block 640, the networking device 615 extracts the energy data from the data packet. This may include decrypting the payload of the data packet. The networking device 615 then uploads 645 the energy data to the remote server 620.

In FIG. 6B, the remote server 620 authenticates a user at block 650. The remote server then receives user input at block 655. The user input may be an input to control energy meter 605. The remote server 620 sends a control instruction 660 to the networking device 615. The networking device 615 may then send the control instruction 665 to the protocol conversion device 610 via the second protocol. Alternatively, the networking device 615 may generate a new instruction responsive to receiving the instruction from the remote server 620, and send the new instruction to the protocol conversion device 610. Note that in an alternative embodiment, the networking device 615 may authenticate the user and receive the user input, and may not receive any instructions from the remote server 620. Instead, the networking device 615 may generate the instruction based on the user input and send it to the protocol conversion device 610.

The instruction sent to the protocol conversion device 610 may be a payload of a data packet. The data packet may include an unencrypted header identifying the networking device 615 as a source device and energy meter 605 as a destination device. The header may also identify a first protocol associated with the energy meter 605 and a second protocol associated with the networking device 615.

At block 670, the protocol conversion device 610 identifies that the data packet is addressed to the energy meter 605 and a first protocol associated with the energy meter 605. The protocol conversion device 610 then forwards 675 the data packet to the energy meter 605 using the identified first protocol. At block 680, the energy meter 605 executes the instruction 680. In one embodiment, the energy meter 605 decrypts the payload of the data packet prior to executing the instruction.

Figure 7:
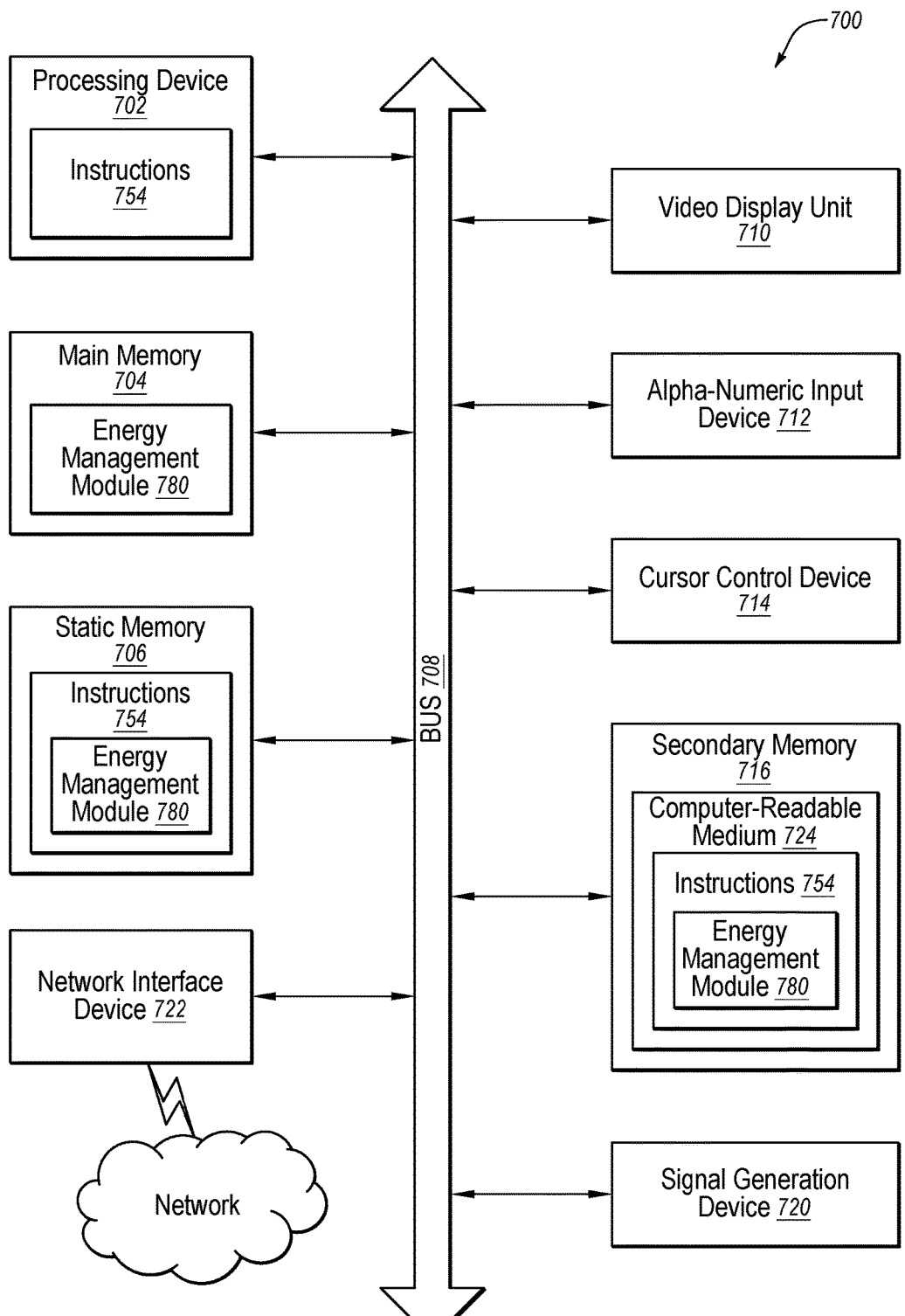
FIG. 7 illustrates a block diagram of one embodiment of a computing device.

FIG. 7 illustrates an example of a computing device, in accordance with implementations described herein. The computing device 700 may correspond to a first networking device 102, a second networking device 105, a computing device 125, 128, a server computing device 135, an EMCU 145, 150, 155 or a protocol conversion device 140 of FIG. 1. In embodiments of the present invention, the machine may be connected (e.g., networked) to other machines in a Local Area Network (LAN), an intranet, an extranet, or the Internet. The computing device may operate in the capacity of a server or a client machine in a client-server network environment, or as a peer machine in a peer-to-peer (or distributed) network environment. The computing device may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "computing device" shall also be taken to include any collection of machines (e.g., computers) that individually or jointly execute a set (or multiple sets) of instructions to perform any one or more of the methodologies discussed herein.

The example computing device 700 includes a processing device 702, a main memory 704 (e.g., read-only memory (ROM), flash memory, dynamic random access memory (DRAM) such as synchronous DRAM (SDRAM) or Rambus DRAM (RDRAM), etc.), a static memory 706 (e.g., flash memory, static random access memory (SRAM), etc.), and a secondary memory 716 (e.g., a data storage device), which communicate with each other via a bus 708. In some embodiments, the computing device 700 may lack one of more of these components, such as the secondary memory 716.

The processing device 702 represents one or more general-purpose processors such as a microprocessor, central processing unit, or the like. The processing device 702 may include a complex instruction set computing (CISC) microprocessor, reduced instruction set computing (RISC) microprocessor, very long instruction word (VLIW) microprocessor, processor implementing other instruction sets, or processors implementing a combination of instruction sets. The processing device 702 may also be one or more special-purpose processing devices such as an application specific integrated circuit (ASIC), a field programmable gate array (FPGA), a digital signal processor (DSP), network processor, or the like.

The computing device 700 may further include a network interface device 722, or multiple different network interface devices (e.g., that support different communication protocols). The computing device 700 also may include a video display unit 710 (e.g., a liquid crystal display (LCD) or a cathode ray tube (CRT)), an alphanumeric input device 712 (e.g., a keyboard), a cursor control device 714 (e.g., a mouse), and a signal generation device 720 (e.g., a speaker) in some embodiments.

The secondary memory 716 may include a machine-readable storage medium (or more specifically a computer-readable storage medium) 724 on which is stored one or more sets of instructions 754 such as instructions for an energy management module 780. The static memory 706 may additionally or alternatively include embedded instructions embodying any one or more of the methodologies or functions described herein (e.g., for energy management module 780). The instructions 754 may also reside, completely or at least partially, within the main memory 704 and/or within the processing device 702 during execution thereof by the computer system 700; the main memory 704 and the processing device 702 also constituting machine-readable storage media.

While the computer-readable storage medium 724 is shown in an example embodiment to be a single medium, the term "computer-readable storage medium" should be taken to include a single non-transitory medium or multiple non-transitory media (e.g., a centralized or distributed database, and/or associated caches and servers) that store the one or more sets of instructions. The term "computer-readable storage medium" shall also be taken to include any medium that is capable of storing or encoding a set of instructions for execution by the machine that cause the machine to perform any one or more of the methodologies of the present invention. The term "computer-readable storage medium" shall accordingly be taken to include, but not be limited to, solid-state memories, and optical and magnetic media.

Figure 8:
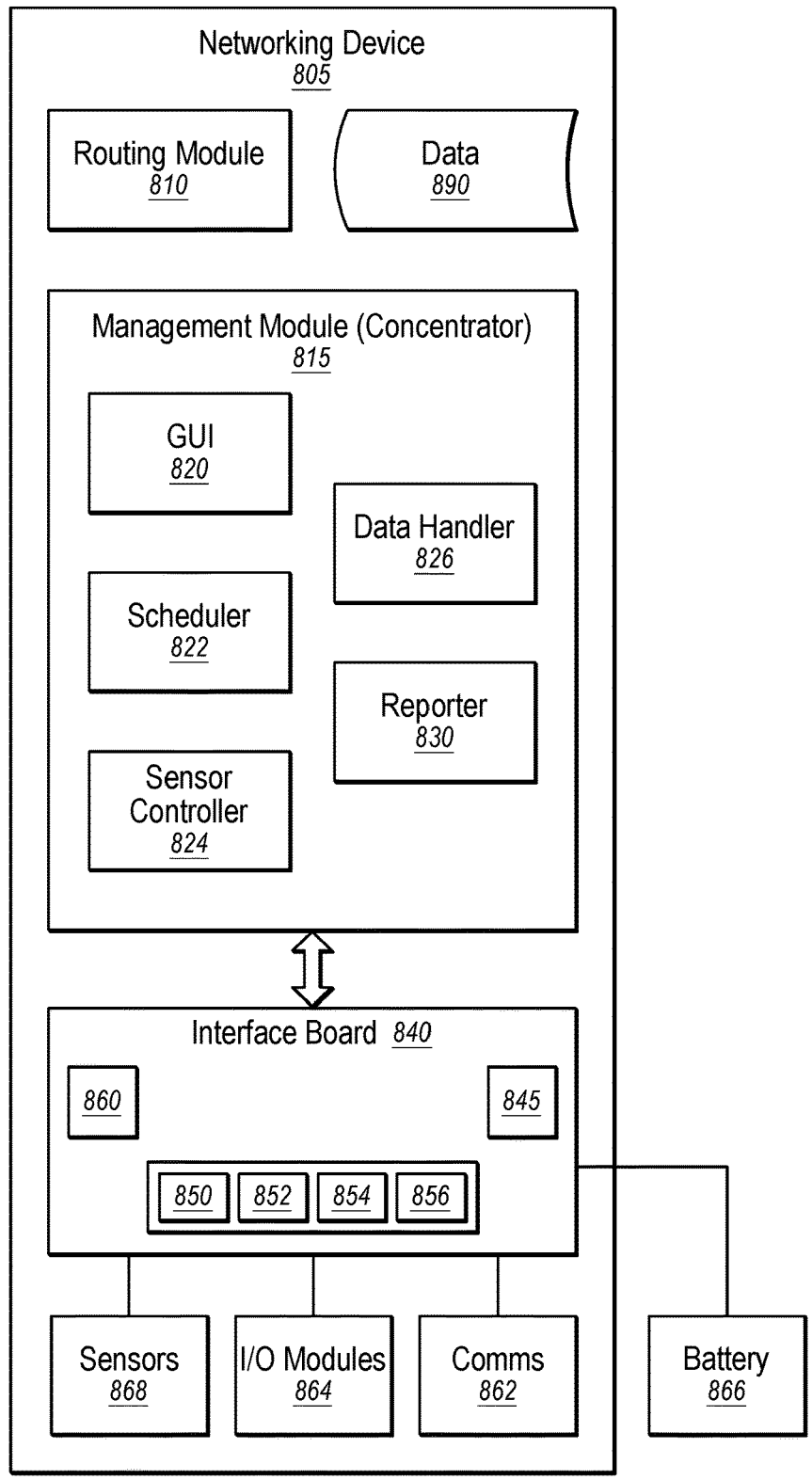
FIG. 8 is a block diagram illustrating two components of a management system, in accordance with one implementation of the present disclosure.

FIG. 8 is a block diagram illustrating a component of a management system, in accordance with one implementation of the present invention. Specifically, FIG. 8 illustrates a networking device 805 that may act as a gateway for a management system. The networking device 805 includes an interface board 840 which may act as a management bridge for the management system. The management system may be used to manage, monitor and/or control any type and any number of devices. The devices in the management system may include sensors, actuators, meters, etc.

The networking device 805 may be a standard networking device that performs the functions of one or more of a cable modem, a DSL modem, a DSL router, a wireless router, a network switch, a wireless access point, and so on. In one embodiment, the networking device 805 includes a routing module 810 that performs standard operations of the networking device 805 as well as a management module 815 that adds functionality of a gateway for a management system to the networking device 805. The management module 815 may also be referred to a "concentrator."

The management module 815 may be software or firmware that has been added to or storage on a non-volatile memory of the networking device 805. Alternatively, or additionally, the management module 815 may include a hardware logic (e.g., a circuit chip) that is installed on the networking device. The management module 215 may be installed onto the networking device by an end user, by a service provider (e.g., by an internet service provider) or by a manufacturer of the networking device. In one embodiment, the interface board 840 installs the management module 815 on the networking device 805. Responsive to the interface board 840 being connected to the networking device 805, the interface board 840 may detect that the networking device 805 has sufficient memory to store the management module 815 (concentrator). The interface board 840 may then query a remote server and request that the remote server install the management module 815 on the networking device 805.

The combination of the interface board 840 and the management module 815 in the networking device 805 bridges the communication gap between monitoring and control units (MCUs), which communicate over one set of communication protocols, and the Internet, which has its own set of communication processes and protocols. The management module 815 and interface board 840 together eliminate any need for a dedicated gateway hardware device, thereby reducing upfront hardware costs and overall energy consumption rate.

In one embodiment, the management module 815 includes a graphical user interface (GUI) 820, a scheduler 822, a sensor controller 824, a data handler 826 and a reporter 830. The GUI 820 may enable end-user access to all components of the management system, including the management module 815, the interface board 840 and MCUs. The GUI 820 additionally provides system monitoring, control and configuration capabilities locally to a user (without the need for an Internet connection) and remotely (over the Internet).

Controller 824 issues commands to MCUs. The commands may include on, off and standby commands. The commands may also include power level state commands, increment power commands and decrement power commands. The commands may be issued responsive to user interaction with the GUI. Alternatively, the commands may be issued responsive to instructions received from a remote server (e.g., from a remote server that provides a web interface for the energy management modules 815). The commands may also be generated automatically by the scheduler 822 according to a configured schedule.

Scheduler 822 automates control of MCUs and the appliances or similar devices connected to the MCUs. Scheduler 822 may include a separate schedule for each MCU and/or each appliance, or any combination thereof. The schedules may be set by a user via the GUI 820 and/or may be automatically set from instructions from a remote server or based on usage statistics. For example, appliances that consume large amounts of energy may automatically be scheduled to power off during peak energy usage hours (when the cost of energy may be at its highest). Each schedule may identify when to power on an appliance, when to power off an appliance, and so on.

Reporter 830 may generate statistics from received data 890. For example, reporter 830 may determine average daily, weekly, monthly, yearly, etc. energy usage for each appliance, generate energy usage graphs showing when appliances are used, and so on. Reporter 830 may also receive energy cost data from a remote server, and may use the cost data and data 890 to compute the average daily, weekly, monthly, yearly, etc. energy cost of each appliance. Energy reporter 830 may also receive usage statistics from a remote server. The remote server may receive the data 890 from data handler 825, compute the usage statistics, and provide the usage statistics to reporter 830.

Management module 815 receives data packets containing data 890 from interface board 840. Data handler 826 may then cache the data 890 locally until the data is successfully uploaded to a remote data center via the Internet, deleted by an end-user manually, or deleted by the system to make room for new data. The amount of data which can be stored locally may be dependent on storage capacity of the networking device. For example, cable modems and DSL routers may have minimal storage capacity. Accordingly, if the networking device 805 is a cable modem or a DSL router, then data handler 826 may store minimal or no energy data 890 on the networking device 805. In contrast, wireless routers typically have enough storage capacity to store up to a month of data 890.

In at least one embodiment, a protocol conversion device (e.g., protocol conversion device 140) provides interfaces for supporting concentrator functionality in the networking device 805. Interfaces provided by the protocol conversion device may include a battery interface for monitoring and controlling a power source for the networking device 805 and protocol conversion device. Another interface may include a communication interface for providing external communication links with other networks, including WAN, GPRS, LTE, etc. communication links. Other interfaces may include one or more I/O interfaces, such as one supporting GPIO, and sensor interfaces for identifying one or more states or conditions of the networking device 805 and/or the protocol conversion device. Various states or conditions may include temperature, humidity, or tampering of the networking device 805 and/or the protocol conversion device.

In one embodiment, data handler 826 caches data on multiple different devices. For example, data handler 826 may cause interface board 840 to store data 890, and may cause MCUs to store data. In one embodiment, the MCUs, interface board 840 and networking device 805 maintain redundant copies of data. For example, the MCUs may store the last 30 minutes of data, the protocol conversion device may store the last hour of data, and the networking device may store the last four hours of data. Alternatively, the MCUs, interface board 840 and networking device 805 cache different data. For example, the MCUs may store the last 30 minutes of data, the protocol conversion device may store the previous 4 hours of data (e.g., from 30 minutes in the past to 4.5 hours in the past), and the networking device 805 may store the previous 8 hours of data (e.g., from 4.5 hours in the past to 12.5 hours in the past).

Data handler 826 may receive data packets that contain the data 890, and may modify or otherwise process the data packets. Data handler 826 may decrypt the data packets, extract payloads from the data packets, aggregate the payloads to generate new messages, and so on. Data handler 826 may then transmit the messages to a remote server.

In one embodiment, the management module 815 provides an application programming interface (API) that enables third parties to develop new services for delivery over the management system. This gives third parties the ability to offer new products and services to a targeted audience (e.g., electric companies and energy conscious consumers).

Interface board 840 connects to the management module 815 via an internal bus connection. Interface board 840 may include multiple communication interfaces, such as a 6LowPAN interface 850, a PLC interface 852, a Zigbee interface 854 and a generic RF interface 856.

Interface board 840 additionally may include a forwarding module 860 that receives data packets on an incoming communication interface and transmits the data packets on an outgoing communication interface. In one embodiment, the interface board 840 does not attempt to interpret the payload of data packets being routed through it. This allows the interface board 840 to handle different schemas of data encryption and different protocols during the data exchange process.

All data exchanged through the interface board 840 may have a common, unencrypted header that contains routing information, and may additionally include a payload. The payload may be encrypted on unencrypted. The header of a received data packet may have a fixed size and contain information such as a source protocol identifier (ID), a source global unique identifier (GUID), a destination protocol ID, and a destination GUID. The protocol ID is a unique number that identifies the communication protocols involved in each specific data packet. In one example, 01='Ethernet', 02='powerline', 03='Zigbee, and so on. The source protocol ID identifies the protocol used by the source device and the destination protocol ID identifies the protocol used by the destination device. The GUID is a unique number used to identify every device in the network. The source GUID identifies the source device for a data packet and the destination GUID identifies the destination device for the data packet.

Forwarding module 860 may analyze a received data packet to identify a destination GUID and a destination protocol ID. The forwarding module 860 may then forward the data packet to the destination device having the destination GUID using a protocol having the destination protocol ID. For example, interface board 840 may receive a data packet from management module 815 via an internal bus that is addressed to a particular MCU.

Forwarding module 860 may identify the particular MCU in the header and determine that the MCU supports a PLC protocol. Accordingly, forwarding module 860 may transmit the data packet to the particular MCU using the PLC interface 852. The interface board 840 may also support additional routing methods such as wide broadcast routing and narrow broadcast routing. "Broadcasting" in this instance, refers to transmitting data packets that are received by every device in a network. The interface board 840 can, when connected to energy management module 815, carry out additional tasks such as relaying data for communication with a server computing device, forwarding of security certificates, implementation of system configuration data, verification of system identification and more.

In one embodiment, the payload of data packets are encrypted at the two endpoints (source and destination), which recognize the encryption method and how to decode the message. The endpoints may be, for example, the networking device 805 and MCUs. In one embodiment, data handler 826 encrypts data packets that are to be sent to other devices such as MCUs, interface board 840 or a remote server. Data handler 826 may additionally decrypt data packets received from such other devices. Standard symmetric and/or asymmetric encryption techniques using shared keys or public key pairs may be used to encrypt and decrypt messages. For example, the networking device, server and MCUs may each have digital certificates associated with a unique public key pair. The MCUs may include a public key of the networking device, and the networking device 805 may include public keys of the MCUs. Therefore, the MCUs may encrypt data using their private keys, and the networking device may decrypt the data using a stored copy of the MCU's public keys. In one embodiment, the interface board 840 forwards encrypted data packets without reading or decrypting a payload of the data packets.

Networking device 805 further includes sensors 868 which may be configured as daughter boards on the interface board 840, as separate circuits within networking device 805, or as sensors 868 external to networking device 805. Sensors 868 may be configured for identifying one or more states or conditions of the networking device 805 and/or the interface board 840. Various states or conditions may include temperature, humidity, or tampering of the networking device 805 and/or the interface board 840.

Networking device 805 may further include communication modules 862 which may be configured as daughter boards on the interface board 840, as separate circuits within networking device 805, or as communication modules 862 external to networking device 805. Communication modules 862 may be configured to provide options to connect the networking device 805 locally to sensors 860, EMCUs 145-155 (FIG. 1), or appliances 160-170 (FIG. 1), etc., which may be alternative to or in addition to connections through interfaces 850-856. The communication module 862 may provide an option to connect the networking device 805 locally to sensing devices, meters or appliances, etc., in addition to the original path (e.g., networking device 205 or 805->protocol conversion device 140->MCU 145,150,155->appliance 160, 165, 170). In at least one embodiment, the networking device 805 can optionally directly connect to a meter, actuator, or sensor via a serial interface (e.g., RS485). In that embodiment, metering, actuator or sensor data may be reported directly to the management module 815.

Networking device 805 may further include I/O modules 864 which may be configured as daughter boards on the interface board 840, as separate circuits within networking device 805, or as I/O modules 864 external to networking device 805. I/O modules 864 may be configured to provide local connectivity to sensing and controlling I/O ports such as, but not limited to, sensors, fault detectors, tamper detectors, resets, etc. Any detected/sensed states may be reported to the interface board 840 for further action by the management module 815. The I/O module 864 may provide local connectivity to sensing devices via a group of I/O ports that can be used, for example, to sense for transitions reported by a sensor like fault indicator, tamper detector, etc. This data can be processed by the management module 815 for additional decision making.

Networking device 805 may further include a battery 866 which may be configured internal to or as part of the interface board 840, external to the interface board 840, or may be provided externally to the networking device 805. Battery 866 provides alternative power for network device 805 in the event of a power outage. Battery 866 may also provide its status to interface board 840 for use in determining various factors such as remaining standby time for use in determining types of operations to allow or perform. Status information for the battery 866 also may be provided to networking device 805 or applications responsible for monitoring device capabilities for asset management. The battery 866 may be used to monitor and control a power source for the networking device 805 and/or the protocol conversion device 140. For example, the battery module may provide a way to support battery-backed network devices and monitor and report on the battery status. A battery backed network device can be used to provide additional connectivity in the case of power outage. Knowing the status of the battery (e.g., charging %, failure, etc.) can be useful information to determine the type of operations that can be allowed with certain confidence, or to curtail or defer certain operations during an outage. Battery status information can also be provided to eternal device management software that is responsible for monitoring device capabilities for asset management Any of the sensors 868, communication modules 862, I/O modules 864 and the battery 866 (which collectively may be referred to as "expansion modules") may be added to or removed from the networking device 805 at any time.

To facilitate addition or removal of any expansion module, the interface board 840 additionally may include a configuration module 845. The configuration module 845 may provide configuration and/or enablement of the expansion modules for use with the networking device, and once enabled, use these expansion modules for various operations. The configuration module 845 may include embedded software (firmware) that may be downloaded in the networking device 805. This software includes one or more drivers, an application programming interface (API) or other interface that may be used to enable the expansion modules. For ease in explanation, this software may be referred to as a 'driver" but the software is not strictly limited to being a driver. The driver may be dynamically loaded, such as when the corresponding hardware is coupled to the networking device 805.

The configuration module 845 may receive a command to configure one or more of the expansion modules. For example, a system administrator may physically connect a sensor 868 to the networking device 805. Using a remote system administration tool (e.g., on a server or handheld device), the system administrator may generate a command for the networking device 805 or the interface board 840 to configure the sensor 868 that was physically connected to the networking device 805. In at least one embodiment, the command to configure one or more expansion modules may occur during or in relation to the manufacturing or commissioning of the networking device 805.

Once configured, an expansion module may be accessible by the management module 815 for operations. Successful configuration of the expansion module may allow an application to route communication via alternate routes, or include additional external data for decision making, etc. For example, a GPRS WAN module 864 may be used for communications with server computing device 135 (which could be a meter data management system) as opposed to an Ethernet connection to another network device (modem).

In at least one embodiment, expansion modules may be directly connected and/or mounted to the circuit board of the networking device where the management module runs. In an alternative embodiment, expansion modules may reside on one or more daughter boards and software on the main circuit board may be used to address and communicate with the expansion modules. Drivers may be downloaded to the daughter board to assist the expansion modules to function. The expansion modules may be used to add and/or enhance functionality of the management module 815 and/or the networking device 805. The expansion modules may be selected as part of configuring management module 815 software to utilize various capabilities of the network device 805. This may be done via an external configuration tool that allows a system administrator to select the desired expansion modules and options. In at least one embodiment, a network device 205 can be deployed with specific WAN backhaul option as needed, e.g., some with Ethernet where broadband is available, and some that utilize a cellular backhaul (e.g., for remote areas).

In operation, a driver of the configuration module 845 may be used to interpret data on an application layer. For example, to read voltage of an expansion module, the corresponding driver may instruct the expansion module to send a particular set of bytes to the driver. Of the received bytes, the driver may perform some operations on the bytes (e.g., multiply or add, shift) to obtain the voltage reading. In at least one embodiment, a manufacturer of expansion module may provide a corresponding driver. This may enable a manufacturer to retain a proprietary protocol on the expansion module while permitting the expansion module to function with other expansion modules from other manufactures and/or expansion modules that use different protocols or data formats.

In a specific example, the management module 815 may request a specific voltage reading for a sensor 868 from the configuration module 845. A driver in the configuration module 845 may compose a request for the management module 815 to send the sensor 868 a set of encrypted instructions. The set of encrypted instructions may include a command for the sensor 868 to read a voltage and return a sequence of numbers to the management module 815. The management module 815 may send the set of encrypted instructions to the sensor 868. When the sensor 868 receives the set of encrypted instructions, it may include a sequence of numbers that are encrypted. The sensor 868 may include logic to decrypt the set of encrypted instructions or, alternatively, have logic to execute the set of encrypted instructions. The sensor 868 may, for example, generate a sequence of numbers indicative of the voltage. The sensor 868 may send the sequence of numbers indicative of the voltage to the management module 815 and/or the configuration module 845. The driver in the configuration module 845 may decrypt or decode the sequence of numbers indicative of the voltage to determine the voltage. The configuration module 845 sends the voltage to the management module 815. The management module 815 may then send the voltage, such as via an application layer, to other modules and/or to a server or other remote device.

FIGS. 9-12 illustrate flow diagrams of example methods related to a data management. The methods may be performed by processing logic that may include hardware (circuitry, dedicated logic, etc.), software (such as is run on a general purpose computer system or a dedicated machine), or a combination of both, which processing logic may be included in the 100 of FIG. 1, or another computer system or device. However, another system, or combination of systems, may be used to perform the methods. For simplicity of explanation, methods described herein are depicted and described as a series of acts. However, acts in accordance with this disclosure may occur in various orders and/or concurrently, and with other acts not presented and described herein. Further, not all illustrated acts may be used to implement the methods in accordance with the disclosed subject matter. In addition, those skilled in the art will understand and appreciate that the methods may alternatively be represented as a series of interrelated states via a state diagram or events. Additionally, the methods disclosed in this specification are capable of being stored on an article of manufacture, such as a non-transitory computer-readable medium, to facilitate transporting and transferring such methods to computing devices. The term article of manufacture, as used herein, is intended to encompass a computer program accessible from any computer-readable device or storage media. Although illustrated as discrete blocks, various blocks may be divided into additional blocks, combined into fewer blocks, or eliminated, depending on the desired implementation. The methods of FIGS. 9-12 may be performed, at least in part, by processing logic in a server, such as the server 106 of FIG. 1, or in a networking device 205 of FIG. 2 or networking device 805 of FIG. 8.

Figure 9:
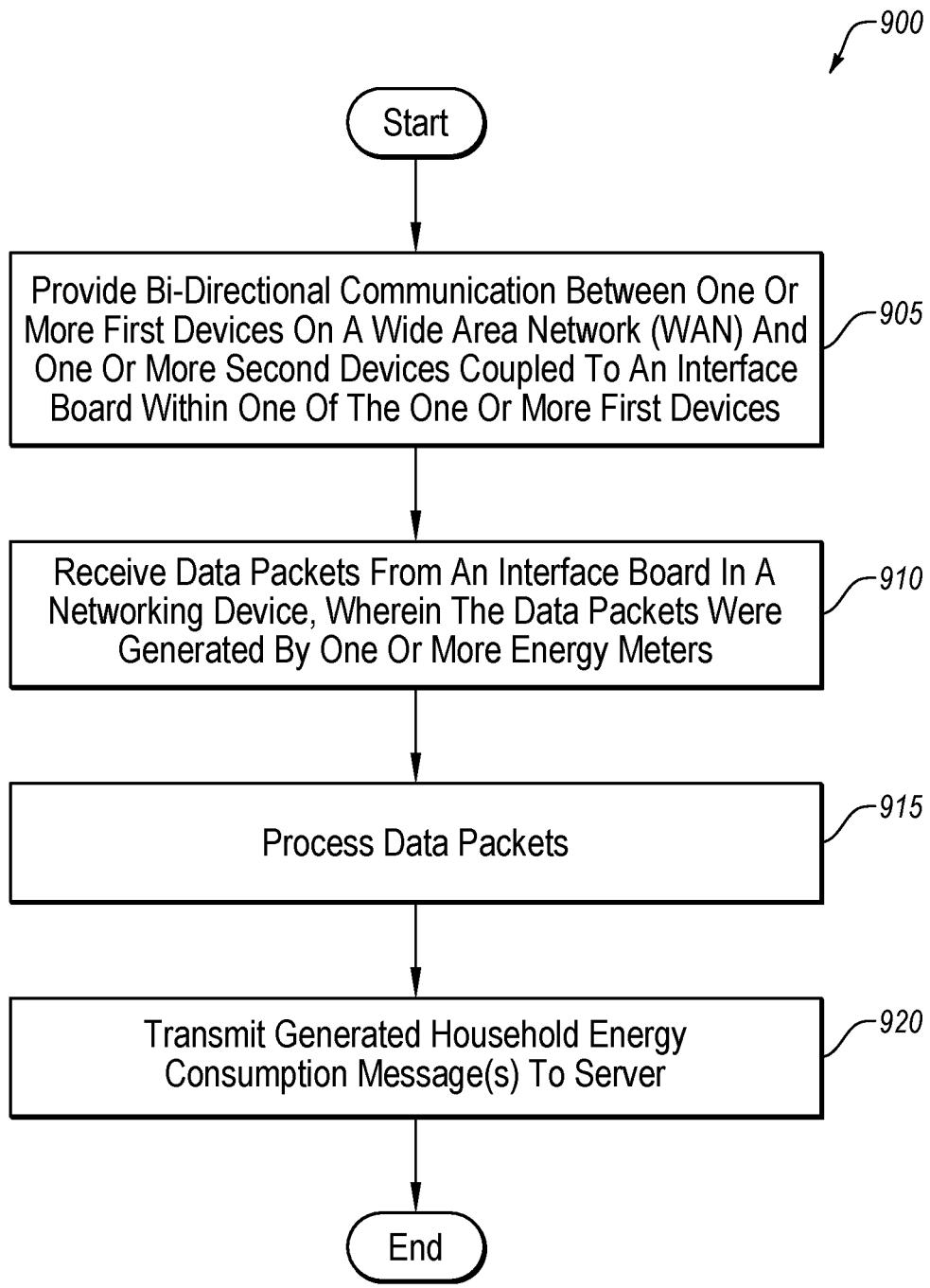
FIG. 9 is a flow diagram illustrating one embodiment of a method for concentrating data by a networking device configured to be a component of a management system.

FIG. 9 is a flow diagram illustrating one embodiment of a method 900 for concentrating data by a networking device configured to be a component of a management system. At block 905 of method 900, processing logic provides bi-directional communication between one or more first devices on a wide area network (WAN) and one or more second device coupled to an interface board within one of the one or more first devices. At block 910, processing logic receives data packets from an interface board one of the one or more first devices. The data packets may have been generated by one or more sensors, actuators, or meters (e.g., by EMCUs or MCUs). The received data packets may contain data, such as energy consumption data, associated with one or more appliances or similar devices connected to the sensors, actuators, or meters.

At block 915, processing logic processes the data packets. This may include decrypting the data packets, extracting payloads from the data packets, and so on. Processing logic may additionally generate messages (e.g., a household energy consumption message). At block 920, processing logic transmits the generated messages to a server. The server may then compute statistics (e.g., energy consumption statistics) from the data and provide the statistics to, for example, a networking device that includes a management module.

Figure 10:
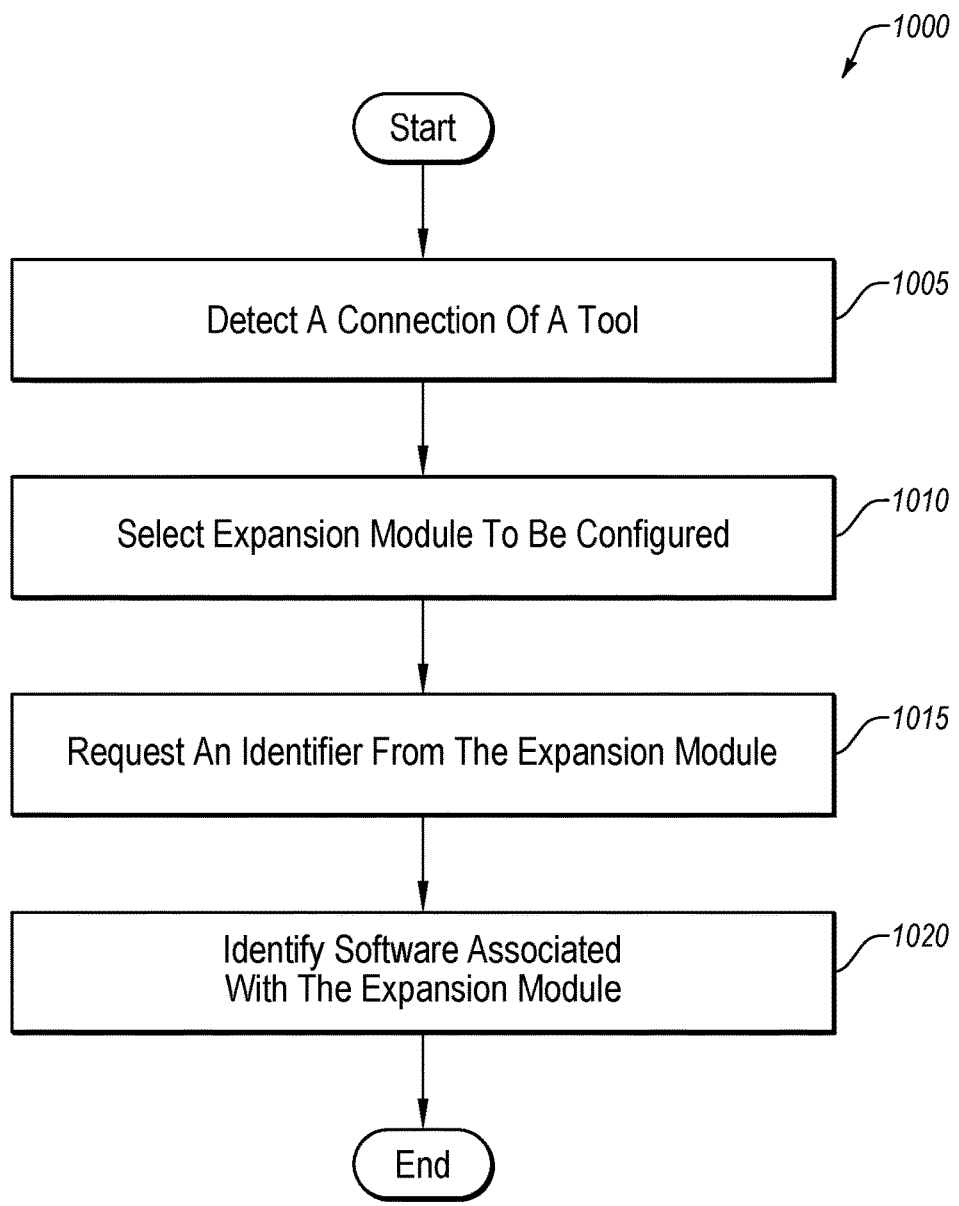
FIG. 10 is a flow diagram illustrating one embodiment of a method for configuring an expansion module in a networking device.

FIG. 10 is a flow diagram illustrating one embodiment of a method 1000 for configuring an expansion module in a networking device.

At block 1005, processing logic may detect a connection of an administrator tool to a networking device and/or to a management module via a configuration interface. The administrator tool may connect to the networking device and/or to the management module in relation to an expansion module being attached to the networking device or to the expansion board.

At block 1010, the processing logic may select an expansion module to be configured. The selected expansion module may include the expansion module that recently attached to the networking device or to the expansion board. The selected expansion modules may also include any expansion modules that have not been configured.

At block 1015, the processing logic may request an identifier from the expansion module. The identifier may include a device number (e.g., a system-based number). The identifier may also include a make, manufacturer, model, etc. of the expansion module.

At block 1020, the processing logic may identify software (e.g., a driver, API, interface) associated with the expansion module based on the identifier of the expansion module. The software may be stored locally or remotely. At block 1025, the processing logic may configure to the management module to communication with the expansion module using the software.

Figure 11:
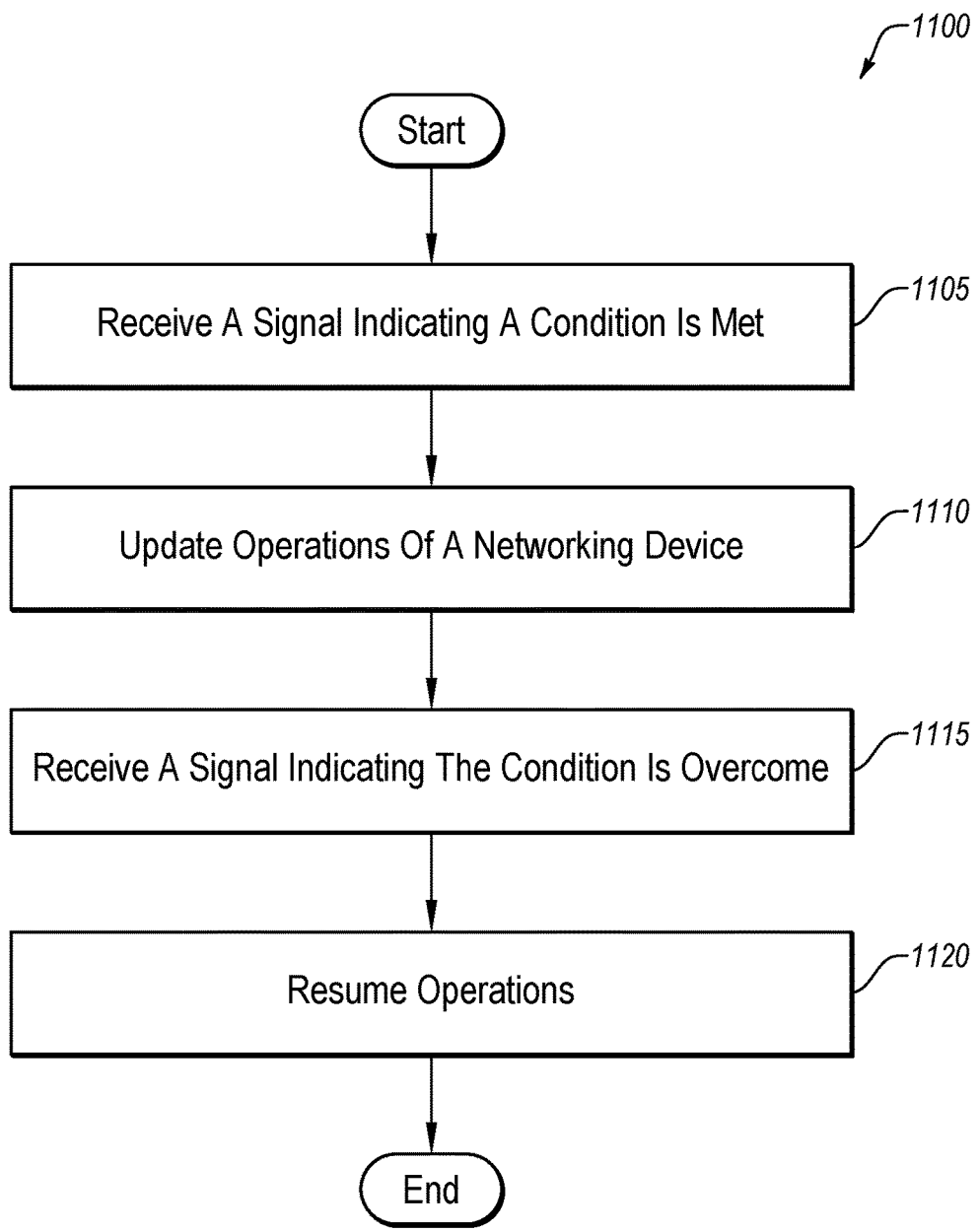
FIG. 11 is a flow diagram illustrating one embodiment of a method for operating a networking device with an attached expansion module.

FIG. 11 is a flow diagram illustrating one embodiment of a method 1100 for operating a networking device with an attached expansion module. At block 1105, processing logic may receive a signal indicating that a particular condition has been met. For example, when the expansion module is a battery, the signal may indicate that the battery power level is below a threshold value (e.g., the condition).

At block 1110, the processing logic may update operations of the networking device based on the particular condition having been met. For example, the processing logic may reduce various operations to conserve battery life over time.

At block 1115, the processing logic may receive a signal that the particular condition has been overcome or is no longer met. For example, the battery may send a signal that is has been charged above a threshold power level. Or, the processing logic may receive a signal that a new battery has been added to a system or that the system is now receiving power from a wired source. At block 1120, the processing logic may resume operations as normal and/or reverse some or all of the reductions in operations from block 1110.

Figure 12:
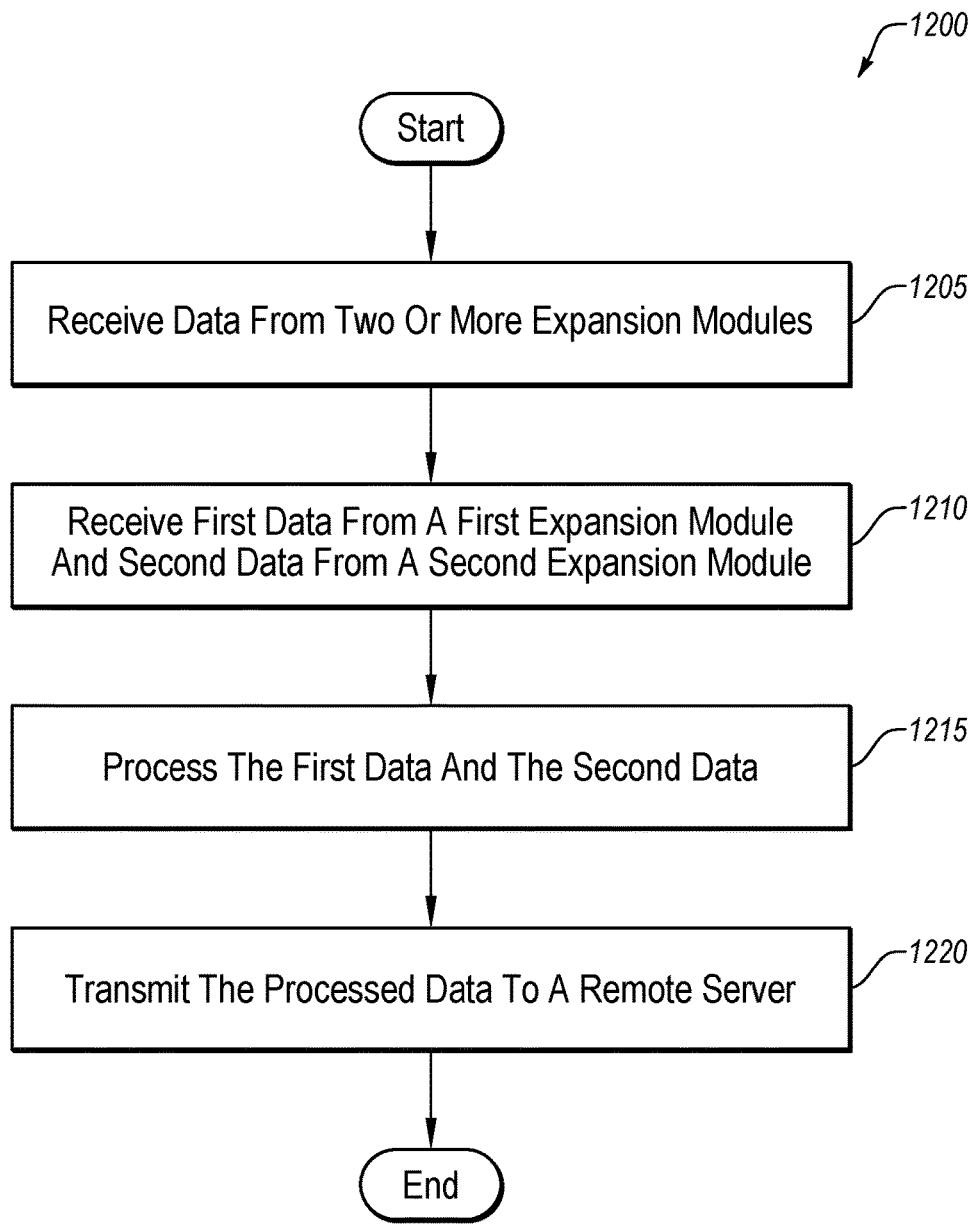
FIG. 12 is a flow diagram illustrating one embodiment of a method for operating a networking device with more than one attached expansion module.

FIG. 12 is a flow diagram illustrating one embodiment of a method 1200 for operating a networking device with more than one attached expansion module. At block 1205, processing logic may receive data from two or more expansion modules. The two or more expansion module may be of the same type or of a different type. The two or more expansion module may be of the same manufacturer or of a different manufacturer. The two or more expansion module may use a same protocol or use a different protocol.

At block 1210, the processing logic may receive first data from a first expansion module and second data from a second expansion module. At block 1215, the processing logic may process the first data from the first expansion module and the second data from the second expansion module. At block 1220, the processing logic may transmit the first processed data and the second processed data to a remote server.

The modules, components and other features described herein (for example in relation to FIGS. 1, 2, and 8) can be implemented as discrete hardware components or integrated in the functionality of hardware components such as ASICS, FPGAs, DSPs or similar devices. In addition, the modules can be implemented as firmware or functional circuitry within hardware devices. Further, the modules can be implemented in any combination of hardware devices and software components, or only in software.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving", "assigning", "modifying", "transmitting", "querying", or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the discussed purposes, or it may comprise a general purpose computer system selectively programmed by a computer program stored in the computer system. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

It is to be understood that the above description is intended to be illustrative, and not restrictive. Many other embodiments will be apparent to those of skill in the art upon reading and understanding the above description. Although the present invention has been described with reference to specific example embodiments, it will be recognized that the invention is not limited to the embodiments described, but can be practiced with modification and alteration within the spirit and scope of the appended claims.

Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A networking device, comprising:
a management module; and
an interface board configured to:
provide bi-directional communication between the management module and one or more expansion modules, wherein the interface board communicates with the management module and connects to the one or more devices via one or more communication protocols supported by the one or more devices;
receive a data packet from a first device;
identify a protocol ID associated with the data packet that identifies a first communication protocol for the data packet that is supported by the first device;
convert the data packet, based on the protocol ID, from the first communication protocol to a second communication protocol for transmission over a TCP/IP connection; and
communicate the data packet in the second communication protocol to the management module.

2. The networking device of claim 1, wherein the interface board is further configured to at least one of send or receive data from at least one sensor identifying one or more states or conditions of the networking device or the interface board.

3. The networking device of claim 1, wherein the interface board is further configured to provide an additional communication link to one of the management module or to a Wide Area Network (WAN).

4. The networking device of claim 1, wherein the interface board is further configured to provide connectivity for at least one of sensing and controlling I/O ports.

5. The networking device of claim 1, wherein the networking device is at least one of a cable modem, a digital subscriber line (DSL) modem, a DSL router, a network switch, a WiFi router or a wireless access point, and wherein the networking device includes the management module configured to receive the data packet, generate one or more messages containing a payload of the data packet and transmit the one or more messages.

6. The networking device of claim 1, wherein the one or more devices store one or more first sets of data packets and the interface board stores a second set of the data packets.

7. The networking device of claim 1, wherein the management module is further configured to:
send control instructions to the interface board for transmission to the one or more devices, wherein the control instructions cause the one or more devices to power on or power off one or more appliances coupled to the one or more devices.

8. A method, comprising:
providing bi-directional communication between one or more first devices on a wide area network (WAN) and one or more second devices coupled to an interface board within one of the one or more first devices;
receiving a data packet from the interface board in a networking device, wherein the data packet comprises usage data generated by one or more devices connected to the interface board via a first communication protocol unsupported by the networking device, wherein the data packet was converted by the interface board, based on a protocol ID, from the first communication protocol to a second communication protocol that is supported by the networking device for transmission over the WAN; and
transmitting payloads of data packets to a server computing device of the one or more first devices, wherein the server computing device generates usage statistics based on the payloads.

9. The method of claim 8, further comprising at least one of sending or receiving data from at least one sensor identifying one or more states or conditions of the networking device or the interface board.

10. The method of claim 8, further comprising communicating over an additional communication link to one of the devices or the WAN.

11. The method of claim 8, further comprising connecting at least one of sensing and controlling I/O ports to at least one of a sensor or one of the devices.

12. The method of claim 8, further comprising sending control instructions to the interface board for transmission to the one or more devices, wherein the control instructions cause the one or more devices to power on or power off one or more appliances coupled to the one or more devices.

13. The method of claim 12, further comprising outputting a graphical user interface to a computing device on a local area network, wherein the graphical user interface identifies the one or more appliances, provides usage statistics and enables a user of the computing device to issue the control instructions.

14. The method of claim 13, further comprising:
receiving usage pricing data from a remote server;
determining costs associated with usage of the one or more appliances; and
providing the costs via the graphical user interface.

15. The method of claim 8, further comprising:
receiving the data packets on a periodic basis;
aggregating the data packets into a consumption message; and
sending the household consumption message to a remote server.

16. A networking device comprising:
an interface board;
a memory; and
a processing device, coupled to the memory, configured to:
provide bi-directional communication between one or more first devices on a wide area network (WAN) and one or more second devices coupled to the interface board within one of the one or more first devices;
receive a data packet from the interface board in a networking device, wherein the data packet comprises usage data generated by one or more devices connected to the interface board via a first communication protocol unsupported by the networking device, wherein the data packet was converted by the interface board, based on a protocol ID, from the first communication protocol to a second communication protocol that is supported by the networking device for transmission over the WAN; and
transmit payloads of data packets to a server computing device of the one or more first devices, wherein the server computing device generates usage statistics based on the payloads.

17. The network device of claim 16, further comprising a sensor configured to at least one of send or receive data from at least one sensor identifying one or more states or conditions of the networking device or the interface board.

18. The network device of claim 16, further comprising a communication module configured to communicate over an additional communication link to one of the devices or the WAN.

19. The network device of claim 16, further comprising I/O ports connecting at least one of sensing and controlling I/O ports to at least one of a sensor or one of the devices.

20. The networking device of claim 16, wherein the networking device is at least one of a cable modem, a digital subscriber line (DSL) modem, a DSL router, a network switch, a WiFi router or a wireless access point, and wherein the networking device comprises an management module configured to receive the data packets, generate a message from the payloads of the data packets, and transmit the message.

* * * * *